(12) United States Patent
Saito

(10) Patent No.: US 8,463,509 B2
(45) Date of Patent: Jun. 11, 2013

(54) WORKING VEHICLE, CONTROL DEVICE FOR WORKING VEHICLE, AND CONTROL METHOD FOR WORKING VEHICLE

(75) Inventor: Yoshiaki Saito, Kawaguchi (JP)

(73) Assignee: Komatsu Ltd., Tokyo (JP)

( * ) Notice: Subject to any disclaimer, the term of this patent is extended or adjusted under 35 U.S.C. 154(b) by 470 days.

(21) Appl. No.: 12/736,162

(22) PCT Filed: Mar. 11, 2009

(86) PCT No.: PCT/JP2009/001087
§ 371 (c)(1),
(2), (4) Date: Sep. 16, 2010

(87) PCT Pub. No.: WO2009/116248
PCT Pub. Date: Sep. 24, 2009

(65) Prior Publication Data
US 2011/0004378 A1    Jan. 6, 2011

(30) Foreign Application Priority Data
Mar. 21, 2008    (JP) ................ 2008-072974

(51) Int. Cl.
*G06F 7/70*    (2006.01)
(52) U.S. Cl.
USPC ........................................... 701/50
(58) Field of Classification Search
USPC ............... 172/2–11; 37/348, 466, 468, 414, 37/416; 701/30, 39, 50, 84, 82, 91, 54, 53; 414/695.5; 702/182; 60/420, 452; 180/69, 180/307, 306, 53.2, 53.3, 53.4, 305, 308; 477/107, 111
See application file for complete search history.

(56) References Cited

U.S. PATENT DOCUMENTS

| | | | |
|---|---|---|---|
| 6,582,340 B1 | 6/2003 | Arie et al. | |
| 7,865,288 B2 * | 1/2011 | Fukushima et al. | 701/54 |
| 7,886,862 B2 * | 2/2011 | Tatsuno et al. | 180/306 |

(Continued)

FOREIGN PATENT DOCUMENTS

| | | |
|---|---|---|
| JP | A-63-265730 | 11/1988 |
| JP | 2843002 B2 | 10/1998 |

(Continued)

OTHER PUBLICATIONS

International Search Report mailed on Apr. 14, 2009 for the corresponding International patent application No. PCT/JP2009/001087.

(Continued)

*Primary Examiner* — Robert Pezzuto
(74) *Attorney, Agent, or Firm* — Posz Law Group, PLC

(57) ABSTRACT

A working vehicle in which an output from an engine is distributed to a traveling system and a hydraulic device system includes a loading operation detection unit that detects whether a loading operation using a work equipment is being performed, a clutch contained in the traveling system and connected to a distributor, a maximum output characteristic control unit that selects a second engine maximum output characteristic from among first and second maximum output characteristics when it is detected that the loading operation is being performed, and a hydraulic oil amount control unit that decreases a clutch pressure of the clutch when it is detected that the loading operation is being performed. In the first engine maximum output characteristic, a maximum output torque in a predetermined engine revolution speed range is lower than that in the second engine maximum output characteristic.

15 Claims, 20 Drawing Sheets

U.S. PATENT DOCUMENTS

| | | | |
|---|---|---|---|
| 8,010,260 B2 * | 8/2011 | Toda | 701/50 |
| 8,096,382 B2 * | 1/2012 | Kamiya et al. | 180/277 |
| 8,306,704 B2 * | 11/2012 | Matsuyama | 701/50 |
| 2004/0188168 A1 | 9/2004 | Aumann | |

FOREIGN PATENT DOCUMENTS

| | | |
|---|---|---|
| JP | A-11-181841 | 7/1999 |
| JP | A-2001-146928 | 5/2001 |
| JP | A-2001-152921 | 6/2001 |
| JP | A-2006-521238 | 9/2006 |
| WO | WO 2007/043290 | 4/2007 |

OTHER PUBLICATIONS

Office Action mailed Mar. 13, 2012 issued in corresponding JP patent application No. 2010-503762.

* cited by examiner

WORKING VEHICLE, CONTROL DEVICE FOR WORKING VEHICLE, AND CONTROL METHOD FOR WORKING VEHICLE

CROSS REFERENCE TO RELATED APPLICATIONS

This application is a U.S. national stage application of PCT/JP2009/001087 filed on Mar. 11, 2009, and claims priority to, and incorporates by reference, Japanese Patent Application No. 2008-072974 filed on Mar. 21, 2008.

TECHNICAL FIELD

The present invention relates to a working vehicle, a control device for a working vehicle, and a control method for a working vehicle.

BACKGROUND ART

For example, in a wheel loader as a working vehicle, engine output is used as working power and traveling power. In the wheel loader, a load such as earth and sand is scooped up with a bucket of a work equipment, the bucket is raised with a boom, and the load is placed on a loading body of a truck. The working efficiency can be increased by rapidly raising the loaded bucket.

Accordingly, within the framework of the conventional technology, an operator operates a brake pedal and an accelerator pedal at the same time during the loading operation. As a result, the revolution speed of a hydraulic pump is increased and the amount of hydraulic oil supplied to the work equipment is increased as the working vehicle travels at a low speed (Patent Citation 1). A technique is also known for controlling the degree of engagement of a clutch correspondingly to a difference in revolution speed between the left and right drive wheels.

PATENT CITATION 1

Japanese Translation of PCT Application No. 2006-521238

PATENT CITATION 2

Japanese Patent Application Laid-Open No. 2001-146928

DISCLOSURE OF INVENTION

Technical Problem

Within the framework of the conventional technology, the accelerator pedal and brake pedal have to be operated at the same time to increase the amount of hydraulic oil supplied to the work equipment, and there is still room for improvement in terms of operability. Another inconvenience is that the power distributed to a traveling system is converted by the brakes into heat and wasted. A special brake pedal combining a brake function and a clutch operation function is sometimes provided separately from the usual brake pedal in a working vehicle. In a work equipment equipped with such a special brake pedal, the special brake pedal is operated during the clutch operation in order to transmit power to the work equipment.

The present invention has been created with the foregoing in view and it is an object of the present invention to provide a working vehicle, a control device for a working vehicle, and a method for controlling a working vehicle that enable the increase in working efficiency.

Other objects of the present invention will become apparent from the following description.

Technical Solution

Reference numerals in parentheses in the following description represent by way of example a correspondence relationship with the elements described in the appended drawings, but these reference numerals are merely illustrative and place no limitation on the technical scope of the present invention.

A working vehicle (1) according to one aspect of the present invention includes an engine (101); a work equipment (51); a traveling system (103); a hydraulic device system (104) provided with a cylinder (128) that actuates the work equipment (51); a distributor (102) that distributes an output from the engine (101) to the traveling system (103) and the hydraulic device system (104); a loading operation detection unit (211) that detects whether a loading operation using the work equipment (51) is being performed; a clutch (110) contained in the traveling system (103) and connected to the distributor (102); a maximum output characteristic control unit (2203) that, when it is detected that the loading operation is being performed, selects a second engine maximum output characteristic from among the first and second maximum output characteristics; and a hydraulic oil hydraulic oil amount control unit (212) that decreases a clutch pressure of the clutch (110) when it is detected that the loading operation is being performed. In the first engine maximum output characteristic, a maximum output torque in a predetermined engine revolution speed range is lower than that in the second engine maximum output characteristic.

According to the second aspect of the present invention, the hydraulic oilhydraulic oil amount control unit (212) performs the following operation (A) and/or (B) in addition to decreasing the clutch pressure of the clutch (110) when it is detected that the loading operation is being performed:

(A) increasing a flow rate of hydraulic oilhydraulic oil supplied from a first pump (120) from among one or more pumps including the first pump (120) for supplying hydraulic oil to the cylinder (128); and (B) supplying the hydraulic oil to the cylinder (118) also from the second pump (121) included in the one or more pumps, in addition to the hydraulic oil supplied from the first pump (120).

According to the third aspect of the present invention, in the working vehicle according to the first or second aspect, the loading operation detection unit (211) determines that the loading operation is being performed when a boom lever (126) is operated to raise the boom (51) and an angle of the boom (51) is equal to or greater than a predetermined angle.

According to the fourth aspect of the present invention, in the working vehicle according to any one of the first to third aspects, there are at least two groups of conditions from among first to third groups of conditions. Each group of conditions includes at least one condition for determining that the loading operation is being performed. The first group of conditions is a group of conditions relating to expression of operator's will. The second group of conditions is a group of conditions relating to a position of the work equipment. The third group of conditions is a group of conditions relating to a state of the traveling system. The loading operation detection unit (211) detects that the loading operation is being performed when each of the conditions selected one by one from at least two groups of conditions from among the first to third groups of conditions is satisfied.

According to the fifth aspect of the present invention, in the working vehicle according to the fourth aspect, the work equipment (51) is a boom (51) provided rotatably at one side of a vehicle body (2). The cylinder (128) is a boom cylinder (128) for rotating the boom (51). The first group of conditions includes at least one of the following conditions (a) and (b):
  (a) a boom lever (126) is operated to raise the boom (51); and
  (b) an extension speed of the boom cylinder (128) takes a positive value.

According to the sixth aspect of the present invention, in the working vehicle according to the fourth or fifth aspect, the work equipment (51) is a boom (51) provided rotatably at one side of a vehicle body (2). The second group of conditions includes at least one of the following conditions (c) and (d):
  (c) an angle of the boom (51) is equal to or greater than a predetermined angle; and
  (d) an angle of the boom (51) is less than a predetermined maximum angle.

According to the seventh aspect of the present invention, in the working vehicle according to any of the fourth to sixth aspects, the third group of conditions includes at least one of the following conditions (e) to (h):
  (e) a ratio of an input revolution speed and an output revolution speed of the clutch (13) when a brake is off is equal to or greater than a predetermined value, or the brake is on;
  (f) a gear ratio set to the transmission (112) is a predetermined gear ratio;
  (g) a traveling range set to the transmission (112) has been switched from reverse to forward; and
  (h) a vehicle speed is equal to or higher than a predetermined speed.

According to the seventh aspect of the present invention, a working vehicle includes an engine (101), a work equipment (51), and a traveling system (103) having a clutch (110). A control device for the working vehicle includes a loading operation detection unit (211) that detects whether a loading operation using the work equipment (51) is being performed; a maximum output characteristic control unit (2203) that, when it is detected that the loading operation is being performed, selects a second engine maximum output characteristic from among the first and second maximum output characteristics; and a hydraulic oil amount control unit (212) that decreases a clutch pressure of the clutch (110) when it is detected that the loading operation is being performed. The control device may be mounted on the working vehicle or may be a device (for example, a server machine) that is present remotely and can communicate with the work equipment.

According to the eighth aspect of the present invention, a working vehicle includes an engine (101), a work equipment (51), and a traveling system (103) having a clutch (110). A control method for the working vehicle includes a step of detecting whether a loading operation using the work equipment (51) is being performed; a step of selecting, when it is detected that the loading operation is being performed, a second engine maximum output characteristic from among the first and second maximum output characteristics; and a step of decreasing a clutch pressure of the clutch (110) when it is detected that the loading operation is being performed.

The working vehicle according to at least one of the above-described first to eighth aspects may be configured as follows. Thus, the clutch (110) is connected to the engine (101) via the distributor (102). The traveling system (103) has, in addition to the clutch (110), the transmission (112) that transmits drive power outputted from the clutch (110) to the drive wheels correspondingly to the designated gear ratio. The hydraulic device system (103) includes, for example, one or more pumps driven via the distributor (102), the boom (51) provided rotatably at one side of the vehicle body (2), the bucket (52) provided rotatably at one side of the boom (51), the boom cylinder (128) for rotating the boom (51), the bucket cylinder (129) for rotating the bucket (52), a first control valve (123) that supplies hydraulic oil discharged from a first pump (120), from among the aforementioned pumps, to the boom cylinder (128) and the bucket cylinder (129) correspondingly to the operation amount of the boom lever (126) and the bucket lever (125), and a second pump (121), from among the aforementioned pumps, that can supply hydraulic oil to the boom cylinder (128) via the first control valve (123).

At least one from among the above-described loading operation detection unit (211), maximum output characteristic control unit (2203), and hydraulic oil amount control unit (212) may be a means and can be constituted by hardware, a computer program, or combination thereof (for example, some are realized by a computer problem, and the remaining are realized by hardware). The computer program is written in a predetermined processor and executed thereby. During information processing conducted by reading a computer program in the processor, a storage region present on hardware resources such as memory can be appropriately used. The computer program may be installed to the computer from a recording medium such as CD-ROM, or may be downloaded to the computer via a communication network.

Advantageous Effects of Invention

In accordance with the present invention, the loading operation state is automatically detected and the engine output is automatically changed to high output. Therefore, an output torque higher than that during usual traveling can be provided to the hydraulic device system (104). As a result, working efficiency during loading operation can be increased.

EXPLANATION OF REFERENCES

1: wheel loader, 5: work equipment, 11: digging object

BEST MODE FOR CARRYING OUT FOR THE INVENTION

Several embodiments of the present invention will be described below with reference to the appended drawings.

Embodiment 1

An embodiment of the present invention will be described below with reference to an application to a wheel loader as a working vehicle. However, the present embodiment can be also applied to other working vehicles that differ from the wheel loader.

Figure 1:
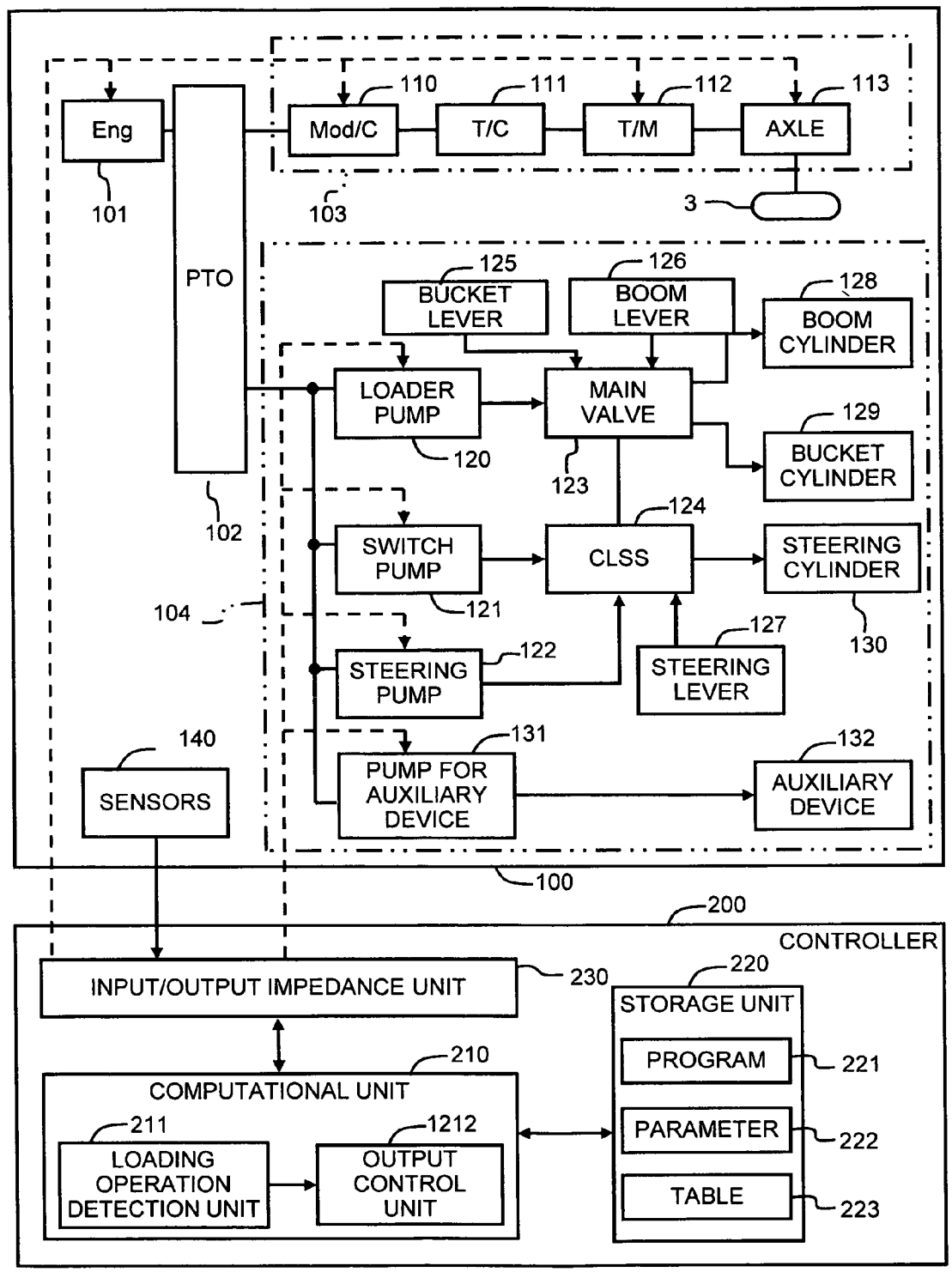
FIG. 1 is an explanatory drawing illustrating the entire configuration of the working vehicle according to the first embodiment of the present invention.

FIG. 1 is an explanatory drawing illustrating schematically the entire configuration of the wheel loader. The wheel loader can be generally subdivided into a mechanical structure 100 and a control structure (referred to hereinbelow as "controller") 200. The mechanical structure 100 has been already explained above. The controller 200 will be explained below.

The mechanical structure 100 includes, for example, an engine 101, a power distributor (PTO: Power Take Off) 102 that distributes the power of the engine 101 to a traveling system 103 and a hydraulic device system 104, the traveling system 103 for causing the wheel loader 1 to travel, and the hydraulic device system 104 for driving mainly a work equipment 5.

Figure 2:
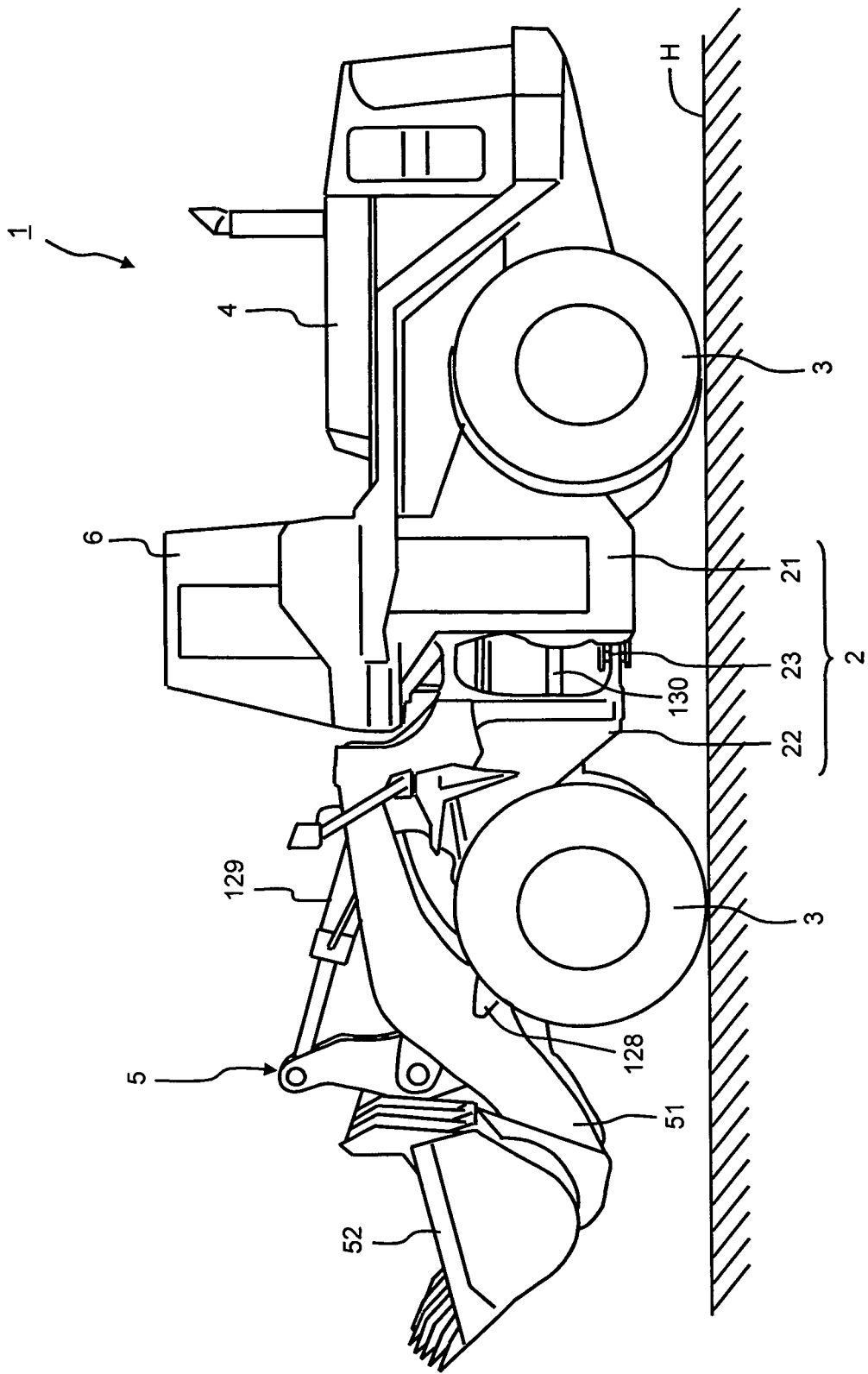
FIG. 2 is a side view of a wheel loader.

FIG. 2 will be referred to below. FIG. 2 is a side view of the wheel loader 1. The wheel loader 1 includes a vehicle body 2, pairs (left and right) of tires 3 provided at the front and rear sides of the vehicle body 2, a machine room 4 provided at the rear side of the vehicle body 2, the work equipment 5 provided at the front side of the vehicle body 2, and an operator's room 6 provided in the central portion of the vehicle body 2.

The vehicle body 2 is provided with a rear vehicle body 21, a front vehicle body 22, and a joining section 23 that joins the rear vehicle body 21 and the front vehicle body 22. A pair (left and right) of steering cylinders 130 are provided between the rear vehicle body 21 and the front vehicle body 22. Where the operator operates a steering lever 127 (see FIG. 1) within the operator's room 6, a cylinder rod of one of the steering cylinders 130 extends and a cylinder rod of the other steering cylinder 130 contracts in response to this operation. As a result, the pathway of the wheel loader 1 can be changed.

The machine room 4 accommodates the engine 101 and pumps 120. The work equipment 5 is provided with a boom 51 that is provided rotatably so as to extend forward from the front vehicle body 22, and a bucket 52 provided rotatably at the distal end of the boom 51. The wheel loader 1 includes a boom cylinder 128 for rotating the boom 51 in the vertical direction and a bucket cylinder 129 for rotating the bucket 52.

Returning to FIG. 1, the traveling system 103 includes, for example, a modulation clutch (can be also referred to hereinbelow as "clutch") 110, a torque converter 111, a transmission 112, and an axle 113. The clutch 110 is designed with consideration not only for engagement and disengagement, but also for slip. The engagement and disengagement of the clutch 110 is controlled, for example, hydraulically. More specifically, the clutch 110 is controlled by a hydraulic pressure designated from a controller 200. The pressure (hydraulic pressure) supplied to the clutch 110 will be called hereinbelow "clutch pressure". For the sake of convenience of explanation, the clutch, torque converter, and transmission are denoted in the figure by symbols "Mod/C", "T/C", and "T/M", respectively. The power (rotation torque) outputted from the engine 101 is transmitted to the tires 3 via the clutch 110, torque converter 111, transmission 112, and axle 113.

The hydraulic device system 104 includes, for example, a loader pump 120, a switching pump 121, a steering pump 122, a main valve 123, a load sensing (steering) valve (in the figure, CLSS: Closed Center Load Sensing System) 124, a bucket lever 125, a boom lever 126, a steering lever 127, the boom cylinder 128, the bucket cylinder 129, the steering cylinder 130, a pump 131 for an auxiliary machine, and an auxiliary implement 132.

The loader pump 120 corresponds to "a first pump", the switch pump 121 corresponds to "a second pump", and the main valve 123 corresponds to "a first control valve". The load sensing valve 124 can be also called "a second control valve".

The loader pump 120 serves to supply hydraulic oil to the boom cylinder 128 and the bucket cylinder 129. The steering pump 122 serves to supply hydraulic oil to the steering cylinder 130. The switch pump 121 serves to supply hydraulic oil to either the steering cylinder 130 or to the boom cylinder 128 and the bucket cylinder 129. The pumps 120, 121, 122 are configured, for example, as swash plate hydraulic pumps and the angles of the swash plates are controlled by control signals from the controller 200.

The load sensing valve 124 mechanically controls the supply destination and supply amount for the hydraulic oil discharged from the switch pump 121 correspondingly to a load. The load sensitive valve 124 can be also called "steering valve". In the usual travel mode, the hydraulic oil discharged from the switch pump 121 is supplied to the steering cylinder 130 via the load sensitive valve 124. Thus, in the travel mode, the switch pump 121 acts to assist the steering pump 122 and actuate the steering cylinder 130. In the present embodiment, a CLSS valve is used as an example of the load sensitive valve (or steering valve) 124, but the present invention can be also applied to configurations using other valves that differ from the CLSS valve.

By contrast, in a working cycle, the hydraulic oil discharged from the switch pump 121 is supplied to the boom cylinder 128 via the load sensitive valve 124 and the main valve 123. Thus, during a loading operation, the switch pump 121 acts to assist the loader pump 120 and actuate the boom cylinder 128.

The bucket lever 125 is a device for operating the bucket 52. The boom lever 126 is a device serving to operate the boom 51. The steering lever 127 is a device for operating the steering cylinder 130. The levers 125, 126, 127 are constituted by, for example, an operation unit operated by the operator and a pilot pressure control valve that controls a pilot pressure correspondingly to the operation amount of the operation unit. The main valve 123 supplies the hydraulic oil discharged from the loader pump 120 (or both the loader pump 120 and the switch pump 121) to the boom cylinder 128 or the bucket cylinder 129 in response to the pilot pressure inputted from the bucket lever 125 or the boom lever 126.

The auxiliary implement 132 is a device such as a cooling fan driven by a hydraulic motor. The pump 131 for an auxiliary implement serves to supply hydraulic oil to the auxiliary implement 132.

Various sensors 140 are provided in predetermined positions inside the mechanical structure 100. The sensors 140 is a general name for the below-described sensors 141 to 149 (see FIG. 3). Various states detected by the sensors 140 are inputted as electric signals to the controller 200.

The controller 200 is constituted as an electronic circuit provided with, for example, a computational unit (for example, CPU (Central Processing Unit)) 210, a storage unit (for example, memory) 220, and an input/output interface unit 230. By executing read processing of a program 221 from the storage unit 220, the computational unit 210 can serve as a device provided with a loading operation detection unit 211 and an output control unit 1212.

The loading operation detection unit 211 has the below-described function of detecting whether or not a loading operation is being performed. The output control unit 1212 has a function of controlling the state of the engine 101 and/or engine output transmission system (a state of the transmission system that transmits the engine output to the load device in the wheel loader 1).

The storage unit 220 stores, for example, the program 221, a parameter 222, and a table 223. As mentioned hereinabove, the computational unit 210 detects whether the loading operation is being performed or controls the state of the engine 101 and/or engine output transmission system (a state of the transmission system that transmits the engine output to the load device in the wheel loader 1) by reading the program 221 from the storage unit 220. The parameter 222 as referred to herein is a threshold or a set value that is used by the loading operation detection unit 211 or output control unit 1212. The table 223 as referred to herein is used by the loading operation detection unit 211 or output control unit 1212.

The input/output interface unit 230 is a circuit for transmitting and receiving electric signals between various sensors 140, clutch 110, transmission 112, and pumps 120 to 122, 131. The computational unit 210 receives signals from the sensors 140 via the input/output interface unit 230. Further, the computational unit 210 outputs a control signal to the clutch 110 or pumps 120 to 122, 131 via the input/output interface unit 230. The above-described configuration of the controller 200 is shown in a form simplified to a degree necessary to understand and implement the present invention, and the present invention is not limited to the above-described configuration.

Figure 3:
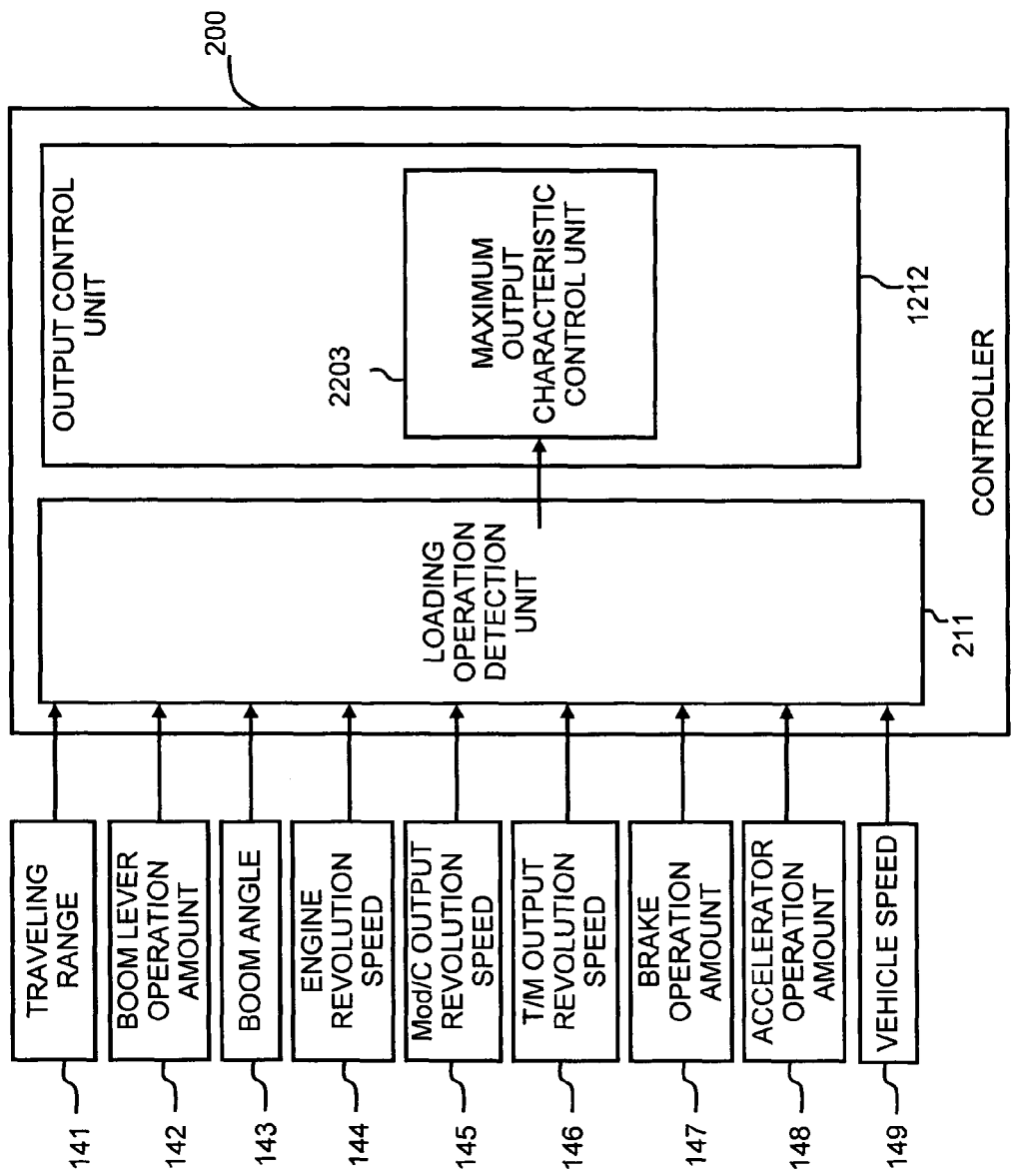
FIG. 3 is an explanatory drawing illustrating schematically the controller functions.

FIG. 3 is an explanatory drawing mainly focused on the functions of the controller 200. Sensors 141 to 149 constituting various sensors 140 are connected to the controller 200. The travel range sensor 141 detects whether the travel range set to the transmission 112 is Forward (F), Neutral (N), or Reverse (R). The travel range sensor 141 can also detect the number of gear ratios set for the transmission 112. The travel range sensor 141 is not required to be configured as a sensor. The travel range or number of gear ratios can be found by using a signal outputted to the transmission 112 from the transmission control circuit located within the controller 200.

The boom lever operation amount sensor 142 detects the operation direction and operation amount of the boom lever 126. The boom angle sensor 143 detects the angle of the boom 51. The engine revolution speed sensor 144 detects the revolution speed of the engine 101. The clutch output revolution speed sensor 145 detects the revolution speed (output shaft revolution speed of the clutch 110) outputted from the clutch 110. The transmission output revolution speed sensor 146 detects the revolution speed (output shaft revolution speed of the transmission 112) outputted from the transmission 112. The brake pedal operation amount sensor 147 detects the operation amount of the brake (for example, a brake pedal) in the operator's room 6. The accelerator operation amount sensor 148 detects the operation amount (can be referred to hereinbelow as "accelerator depression amount") of the accelerator (for example, an accelerator pedal) in the operator's room 6. The vehicle speed meter 149 serving as an example of the "vehicle speed detection unit" detects the speed of the working vehicle 1.

The loading operation detection unit 211 located within the controller 200 determines where the loading operation is being performed by appropriately using the signals from the sensors 141 to 149.

The output control unit 1212 has a maximum output characteristic control unit 2203 (more specifically, for example, a maximum output characteristic control program is included in the program 221). The maximum output characteristic control unit 2203 selects a P-mode maximum output characteristic from among the P-mode maximum output characteristic and E-mode maximum output characteristic when the loading operation detection unit 211 detects that the loading operation is being performed.

The output control unit 1212 executes the control such that the maximum output characteristic of the engine 101 matches the maximum output characteristic (P-mode maximum output characteristic or E-mode maximum output characteristic) corresponding to the selected control mode (P-mode or E-mode). More specifically, for example, the output control unit 1212 controls the fuel injection amount so that the engine output torque at the detected engine revolution speed does not exceed the maximum output torque at the engine revolution speed in the selected maximum output characteristic.

Figure 4:
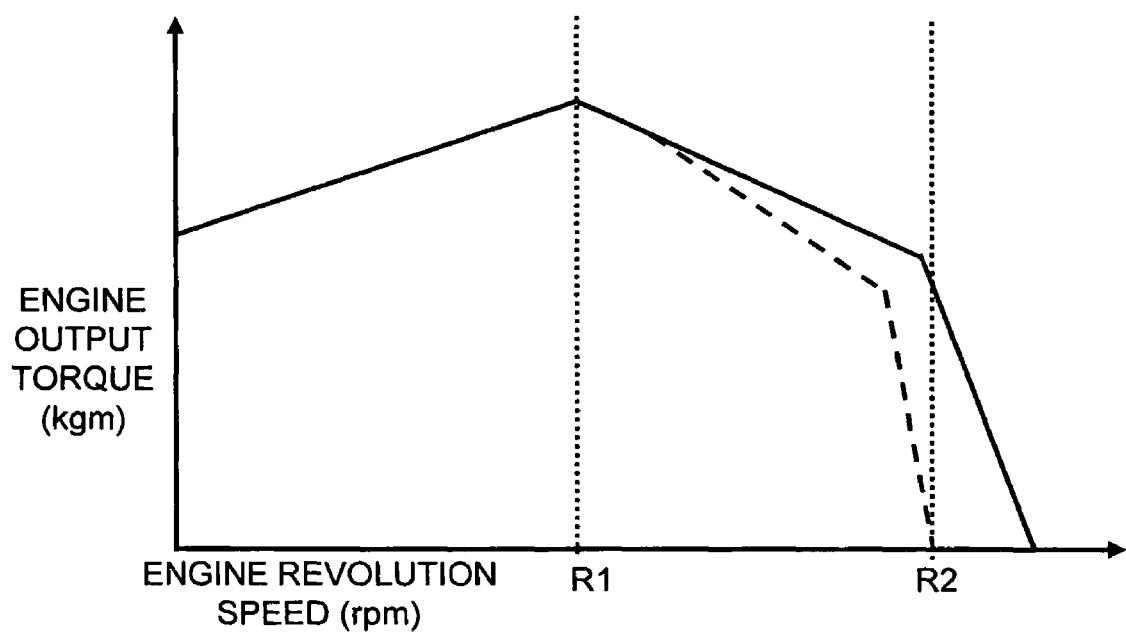
FIG. 4 is a diagram representing a P-mode maximum output characteristic and an E-mode maximum output characteristic.

FIG. 4 is a diagram representing the P-mode maximum output characteristic and the E-mode maximum output characteristic. The maximum output characteristic is an engine characteristic determined by the maximum output torques of the engine at various engine revolution speeds.

The P-mode maximum output characteristic is shown by a solid line in FIG. 4 and determined by the maximum output torques of the engine at various engine revolution speeds that can be outputted in the P-mode. The "P-mode" as referred to herein is a power mode, namely, a control mode in which power has a priority over fuel consumption.

The E-mode maximum output characteristic is shown by a combination of a solid line and a dot line in FIG. 4 and determined by the maximum output torques of the engine at various engine revolution speeds that can be outputted in the E-mode. As follows from FIG. 4, in the E-mode maximum output characteristic, the maximum output torque within a predetermined engine revolution speed range (for example, the range from R1 to R2 shown in FIG. 4) is lower than that in the P-mode maximum output characteristic. Further, with the E-mode maximum output characteristic, the maximum engine revolution speed that can be outputted in the E-mode is lower than the maximum engine revolution speed that can be outputted in the P-mode. The "E-mode" as referred to herein is an economy mode in which fuel consumption takes priority over power.

In this example, the maximum output characteristics that can be selected include two characteristics of the P-mode maximum output characteristic and the E-mode maximum output characteristic, but there may be three or more such characteristics. Further, a plurality of maximum output characteristics may be also obtained by changing one maximum output characteristic in multiple stages or in a stepless manner. Further, the maximum output characteristic is not limited to the broken line such as shown by way of example in FIG. 4, and the entire maximum output characteristic or part thereof may be a curve.

Figure 5:
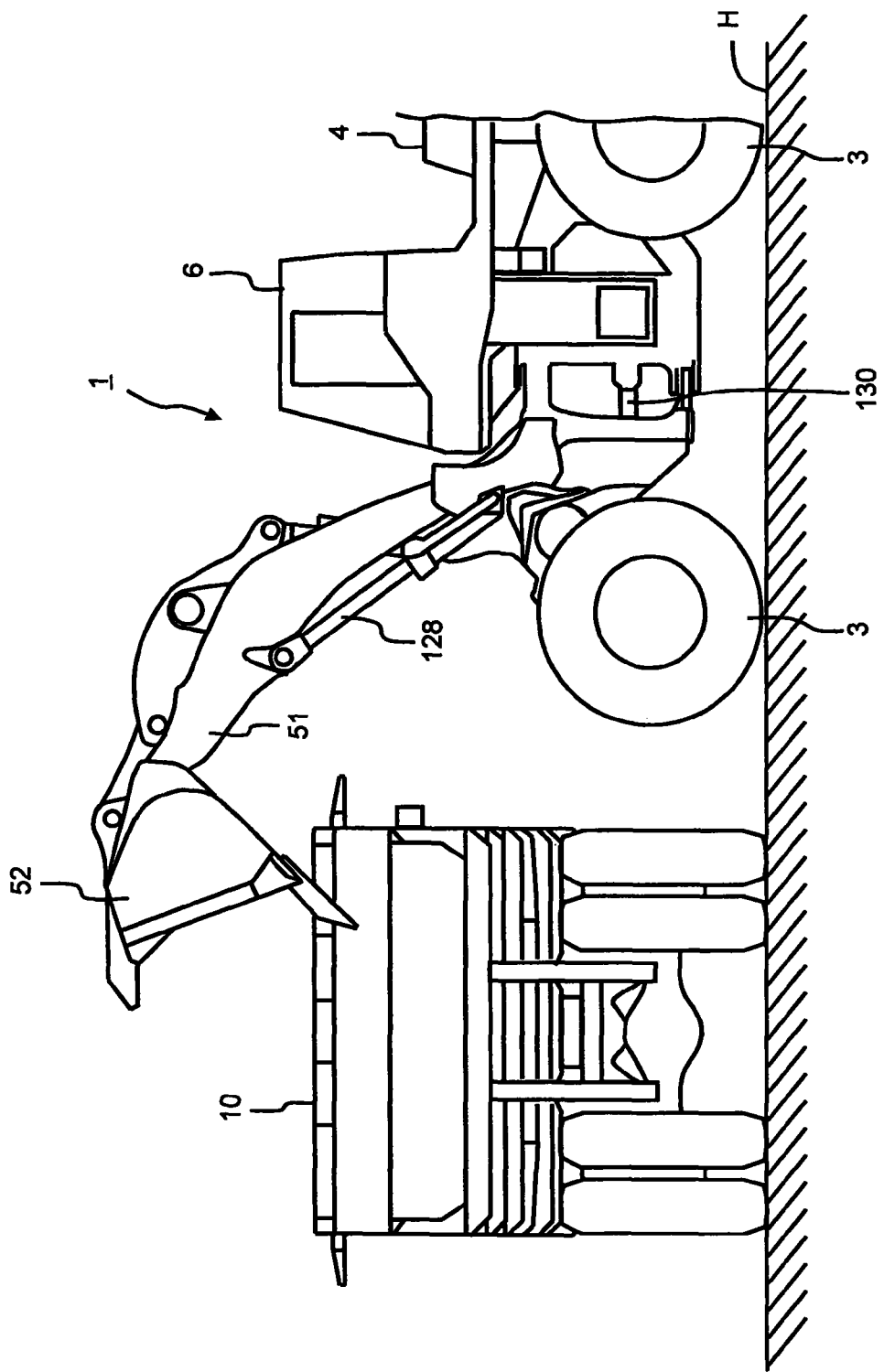
FIG. 5 is an explanatory drawing illustrating how a loading operation is performed.

FIG. 5 is an explanatory drawing illustrating the mode of loading operation. The operator lifts the boom 51 to above the load body of a dump truck 10 and rotates the bucket 52 in the dumping direction, thereby dropping the load located in the bucket 52 onto the load body of the dump truck 10.

Figure 6:
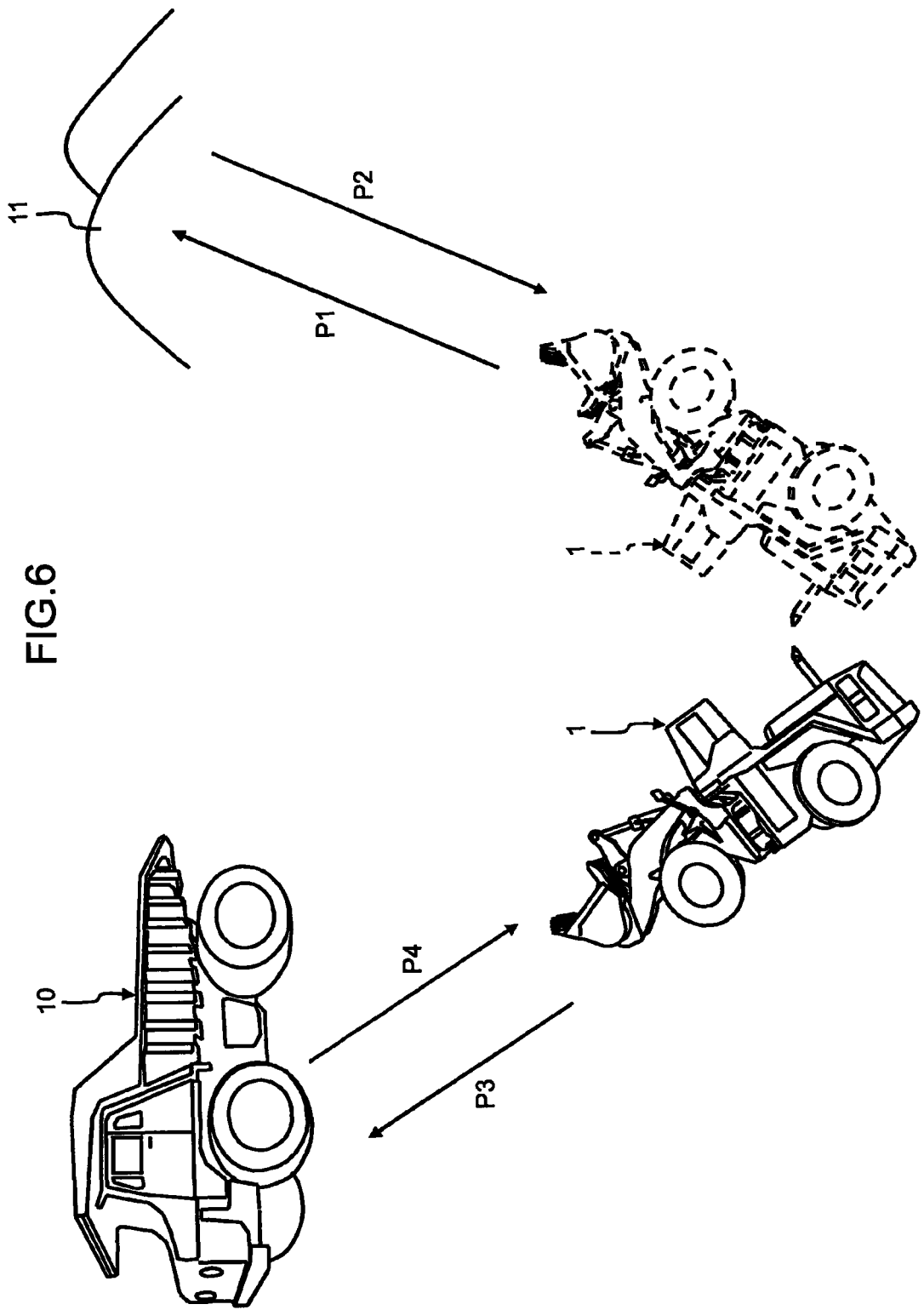
FIG. 6 is an explanatory drawing illustrating schematically working steps of the wheel loader.

FIG. 6 is an explanatory drawing illustrating schematically the flow of operations of the wheel loader 1. The wheel loader 1 repeats the defined operation of digging a digging object 11 such as earth and sand and loading into a transportation unit such as the dump truck 10.

In a first operation step P1, the operator causes the wheel loader 1 to travel towards the digging object 11 in a state in which the bucket 52 is lowered to a position close to the ground surface. The operator thrusts the bucket 52 into the digging object 11 and then rotates the bucket 52 in the tilting direction to accommodate a load in the bucket 52.

In the second operation step P2, the operator raises the bucket 52 containing the load to a predetermined height above the ground to transfer the wheel loader 1 into a traveling posture and rears the wheel loader.

In the third operation step P3, the operator brings the boom 51 close to the dump truck 10, while raising the boom, and drops the load contained in the bucket 52 onto the loading body of the dump truck 10, as shown in FIG. 5. In other words, the loading operation is being performed in the third operation step P3. The loading operation such as that of the present embodiment is performed by bringing the boom 51 close to the dump truck 10, while raising the boom. Therefore, this operation can be also called a "dump approach" operation.

In the fourth operation step P4, the operator rears the wheel loader 1, while lowering the boom 51. Then, a transition is made again to the first operation step P1.

Figure 7:
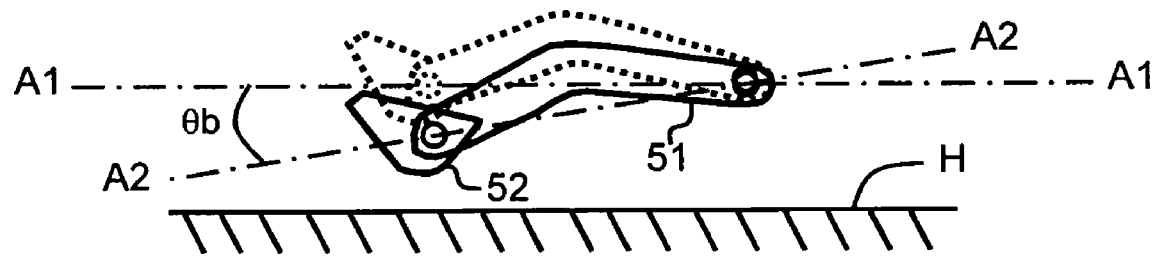
FIG. 7 is an explanatory drawing for defining the stature of the boom during the loading operation.

FIG. 7 is an explanatory drawing illustrating schematically the angle of the boom 51 in the initial state in which the loading operation is started. A line passing through the rotation fulcrum of the boom 51 and parallel to the ground surface (horizontal surface) H is taken as a reference line A1-A1, and a line connecting the rotation fulcrum of the boom 51 and the rotation fulcrum of the bucket 52 is taken as A2-A2. An angle formed by the lines A1-A1 and A2-A2 is taken as a boom angle $\theta b$. The state in which the boom 51 has been rotated downward through an angle of $\theta 1$ from the reference line A1-A1 is taken as negative (minus) and the state in which the boom has been rotated upward is taken as positive (plus). In the present embodiment, these states are detected as initial states in which loading is started. The value of $\theta < 1$ is, for example, −10 degrees. However, this value is merely one example and places no limitation on the present invention.

When the line A2-A2 connecting the rotation fulcrum of the boom 51 and the rotation fulcrum of the bucket 52 is in a position above the position assumed by counterclockwise rotation through an angle of $\theta 1$ from the reference line A1-A1, the loading operation can be determined to have been started. Thus, in the present embodiment the rise of the boom 51 above the angle of the boom 51 during traveling is detected.

The definitions shown in FIG. 7 are merely exemplary and place no limitation on the present invention. For example, as will be described below, "Carry Position" defined by a SAE (Society of Automotive Engineers) standard can be used.

Figure 8:
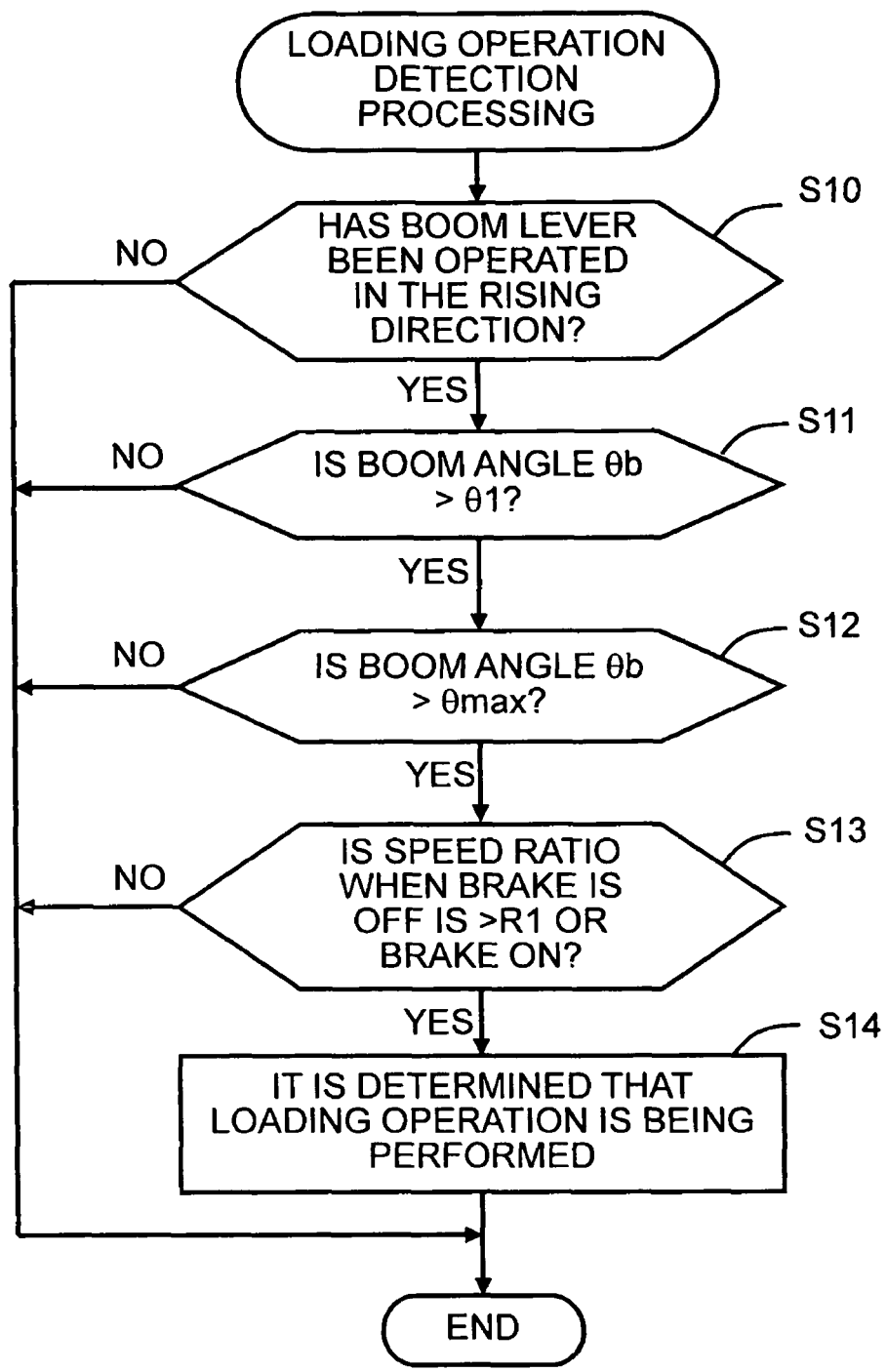
FIG. 8 is a flowchart of the loading operation detection processing.

FIG. 8 is a flowchart showing the processing conducted to detect whether the loading operation is being performed. The below-described flowcharts summarize the processing to a degree necessary to understand and implement the present invention. The loading operation detection unit 211 determines that the loading operation (step P3 in FIG. 6) has been started when all of the below-described conditions are fulfilled.

As the first condition, the loading operation detection unit 211 determines whether the boom lever 126 has been operated in the direction of rising (S10). The operation in the direction of rising as referred to herein means an operation performed to raise the boom 51. Because the boom 51 has to be lifted to perform the loading operation, it is determined whether the boom lever 126 has been operated in the direction of rising.

As the second condition, the loading operation detection unit 211 determines whether the boom angle $\theta b$ is greater than a predetermined angle $\theta 1$ that is set in advance (S11). $\theta 1$ is set, for example, to −10 degrees. In the loading operation the boom 51 is raised and brought close to the dump truck 10. Therefore, it is determined whether the angle $\theta b$ of the boom 51 is greater than the angle at the time traveling is started.

As the third condition, the loading operation detection unit 211 determines whether the boom angle $\theta b$ is less than an upper limit angle $\theta max$ that is set in advance (S12). Where the boom 51 has already been raised to the upper limit, the hydraulic oil is no more required. Therefore, it is verified that the boom angle $\theta b$ is less than the upper limit value $\theta max$.

As the fourth condition, the loading operation detection unit 211 determines whether either the speed ratio when the brake is off is greater than R1 or the brake is on (S13). When the brake is off, it means that the brake pedal has not been operated. The speed ratio as referred to herein is a value obtained by dividing the output revolution rate of the torque converter 111 by the input revolution rate of the torque converter 111. It may be a ratio of the output revolution rate of the clutch 110 and the input revolution rate of the clutch 110. When the brake is on, it means that the brake pedal has been operated and the brake has been actuated.

In the case in which the speed ratio when the brake is on is less than R1 (R1 is, for example, set to 0.3), that is, where the speed ratio is <R1, it means that either the wheel loader 1 is accelerated or the digging operation (step P1) shown in FIG. 6 is performed. In this case, the amount of fluid distributed to the work equipment may be small.

The loading operation detection unit 211 determines that the loading operation is being performed when all of the above-described four conditions are fulfilled (S14).

When it is determined that the loading operation is being performed, the maximum output characteristic control unit 2203 selects, as described hereinabove, the P-mode maximum output characteristic from among the P-mode maximum output characteristic and the E-mode maximum output characteristic.

According to the above-described first embodiment, the state of the loading operation can be automatically detected on the basis of variations of predetermined parameters such as boom lever operation amount and boom angle.

According to this first embodiment, the loading operation is determined to be started when the conditions (S10, S11) for actively detecting whether the loading operation is being performed and conditions (S12, S13) for preventing erroneous detection are all fulfilled. Therefore, the start of loading operation can be determined with better reliability.

Further, according to the first embodiment, when it is detected that the loading operation is being performed, the P-mode maximum output characteristic is selected from among the P-mode maximum output characteristic and the E-mode maximum output characteristic. Therefore, an output torque greater than that during usual traveling (for example, the second operation step P2 explained with reference to FIG. 6) can be provided to the hydraulic device system 104 during the loading operation.

Embodiment 2

Only the difference between the present embodiment and the first embodiment will be described below, and common features of the present embodiment and the first embodiment will be omitted or simplified.

In the second embodiment of the present embodiment, when it is determined that the loading operation is being performed, fluid amount increase control is performed instead of the selection of the P-mode maximum output characteristic or in addition thereto. The present embodiment will be described below in greater detail below with reference to a case in which the selection of the P-mode maximum output characteristic and the fluid amount increase control are both performed when it is detected that the loading operation is being performed.

Figure 9:
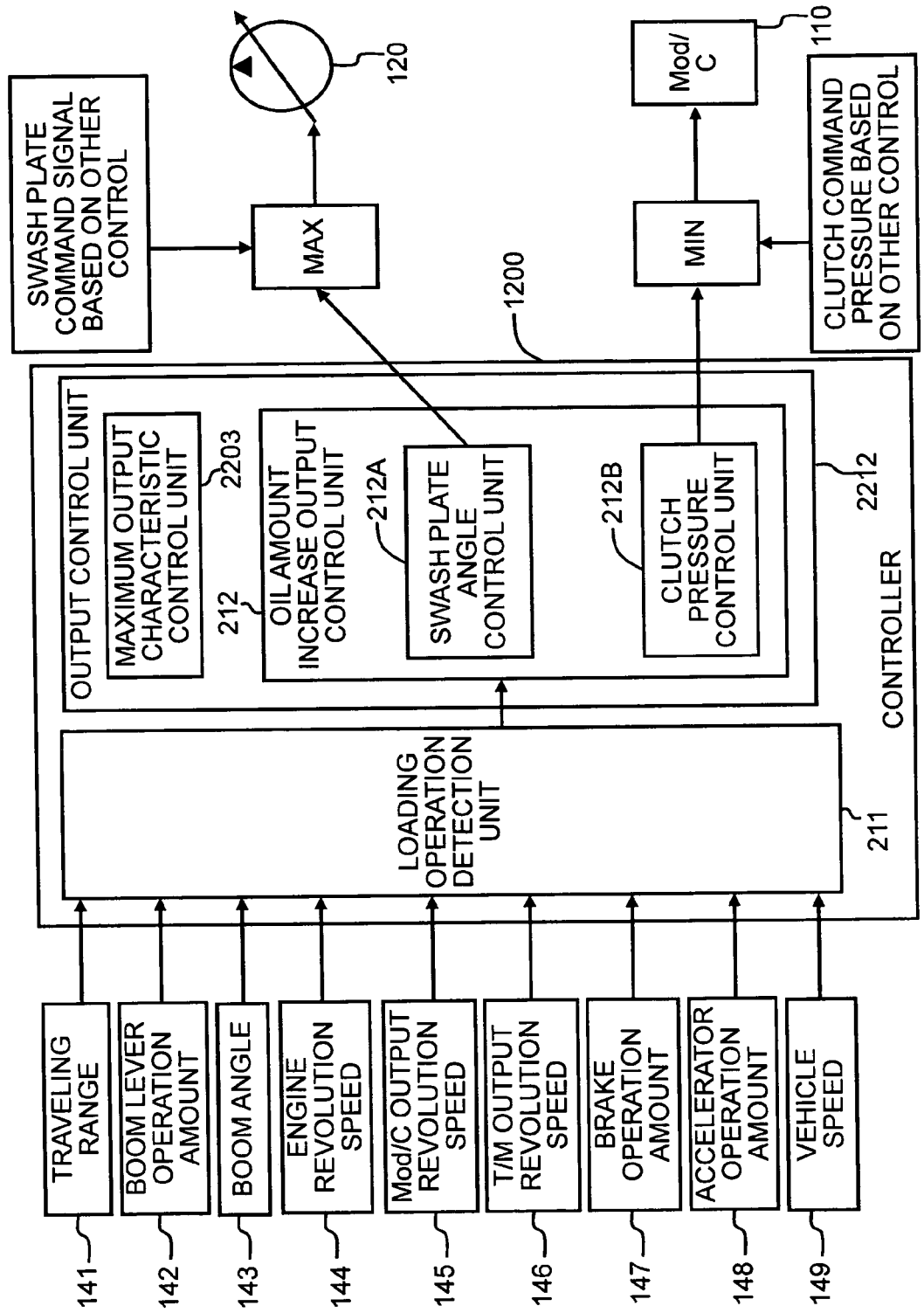
FIG. 9 is an explanatory drawing illustrating schematically the controller according to the second embodiment of the present invention.

FIG. 9 is an explanatory drawing in which the attention is focused on functions of the controller 1200 in the second embodiment of the present invention.

The output control unit 2212 has a fluid amount increase output control unit 212 that increases the amount of hydraulic oil supplied to the boom cylinder 128. Where it is detected that the loading operation is being performed, the fluid amount increase output control unit 212 increases the amount of hydraulic oil supplied to the boom cylinder 128 by increasing the angle of the swash plate of the loader pump 120 and/or decreasing the clutch pressure of the clutch 110.

The fluid amount increase output control unit 212 is provided, for example, with a swash plate angle control unit 212A and a clutch pressure control unit 212B. The swash plate angle control unit 212A outputs a control signal for controlling the swash plate angle. The clutch pressure control unit 212B outputs a control signal for controlling the clutch pressure of the clutch 110. The control signal for controlling the swash plate angle of the loader pump 120 will be referred to hereinbelow as "swash plate angle control signal", the control signal for controlling the clutch pressure will referred to as "clutch pressure control signal", and the clutch pressure designated by the clutch pressure control signal will be referred to as "clutch command pressure".

During the loading operation, the swash plate angle control unit 212A outputs a swash plate angle control signal that designates a larger swash plate angle such as to increase the flow rate of hydraulic oil discharged from the loader pump 120. When another swash plate angle control signal is outputted from another swash plate angle control unit different from the swash plate angle control unit 212A, a swash plate angle control signal representing a larger swash plate angle is selected from among the swash plate angle control signal from the swash plate angle control unit 212A and the other swash plate angle control signal and the selected control signal is inputted to the loader pump 120.

Further, during the loading operation, the clutch pressure control unit 212B outputs a clutch pressure control signal that causes the decrease in clutch pressure to distribute the output of the engine 101 largely to the work equipment 5. When another clutch pressure control signal is outputted from another clutch pressure control unit different from the clutch pressure control unit 212B, a control signal designating a lower clutch pressure is selected from among the clutch pressure control signal from the clutch pressure control unit 212B and the other clutch pressure control signal, and the selected signal is inputted to the clutch 110. For example, in the case of a working vehicle having a special brake installed thereon (such a special brake will be also referred to as "left brake"), a clutch command pressure produced by the special brake corresponds to one of the aforementioned other clutch pressure control signals.

Figure 10:
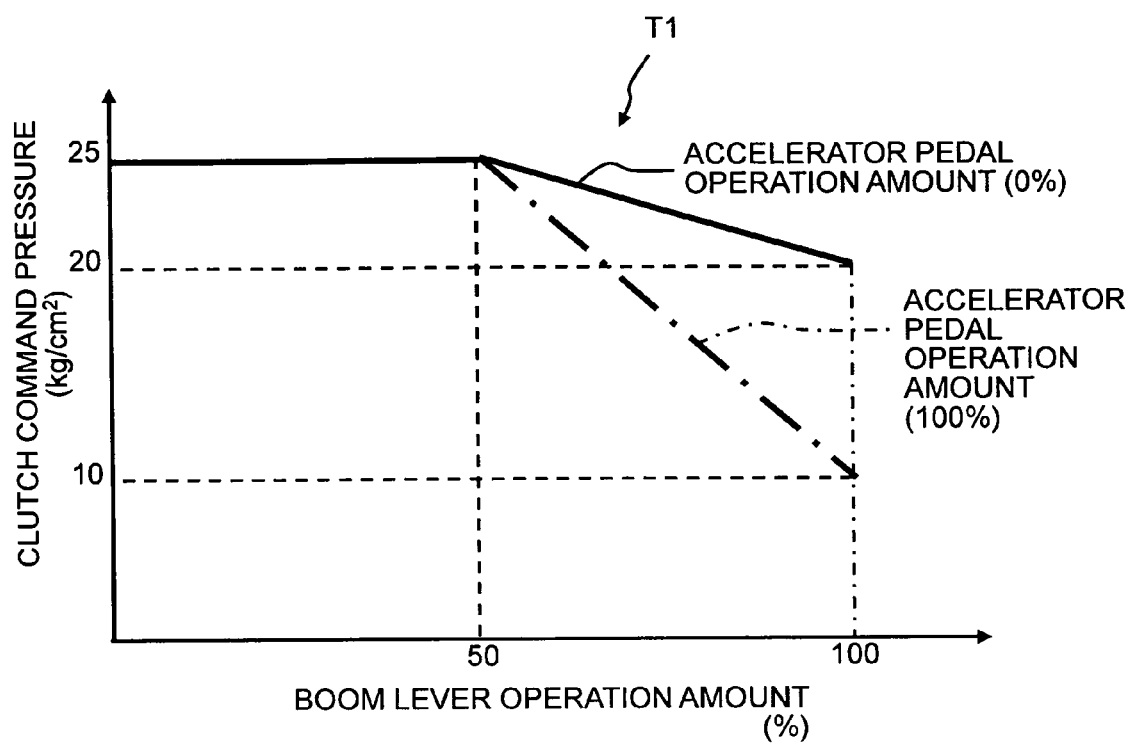
FIG. 10 is a table for setting the clutch command pressure.
Figure 11:
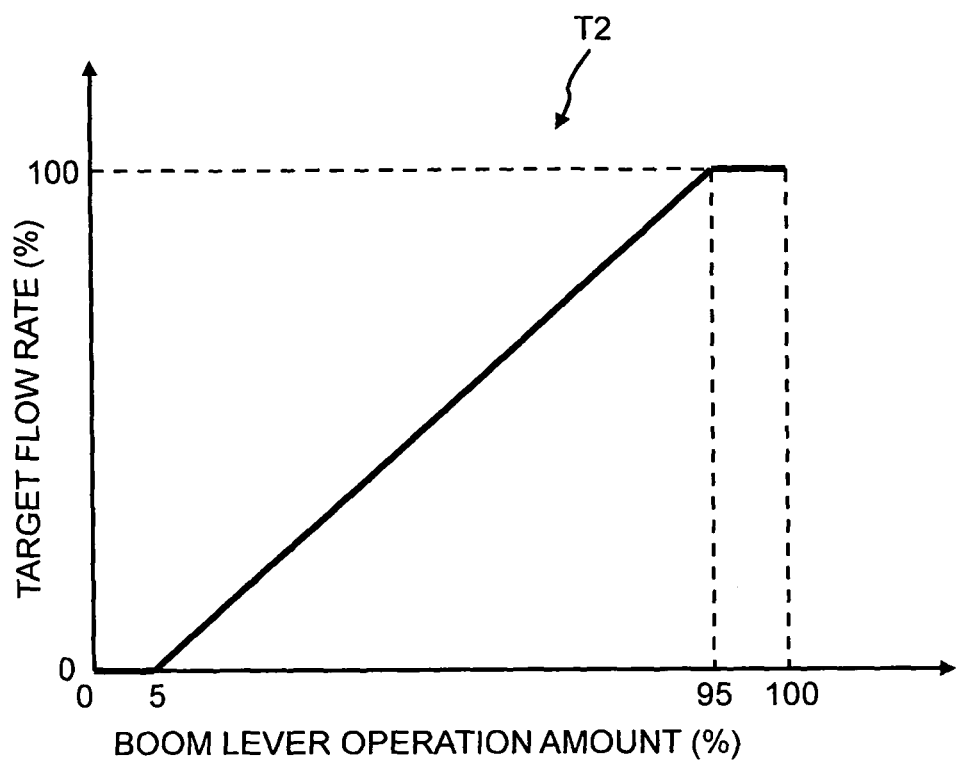
FIG. 11 is a table for setting the pump displacement.

FIG. 10 shows a table T1 that is used to control the clutch command pressure. The tables T1, T2 shown in FIG. 10 and FIG. 11 are examples of the table 223 shown in FIG. 1. An operation amount (%) of the boom lever 126 is plotted against the abscissa in FIG. 10, and a clutch command pressure ($kg/cm^2$) is plotted against the ordinate in FIG. 10. The boom lever operation amount is a lever operation amount in the case in which the boom 51 is raised. A thick solid line in the figure illustrates the case in which the operation amount of the accelerator pedal is 0%, and a dot-dash line in the figure illustrates the case in which the operation amount of the accelerator pedal is 100%. Within a range in which the operation amount of the accelerator pedal is more than 0% and less than 100%, a value is used that is found by interpolation from the 0% characteristic shown by the solid line and the 100% characteristic shown by the dot-dash line.

Within a 0 to 50% range of the boom lever operation amount, the clutch command pressure is increased and the output of the engine 101 is largely distributed to the traveling system. Where the boom lever operation amount exceeds 50%, the clutch command pressure is decreased correspondingly to the boom lever operation amount. The settings are such that the larger is the operation amount of the accelerator pedal the higher is the ratio to which the clutch command pressure decreases. Thus, in the present embodiment, as the operation amount of the accelerator pedal increases, the clutch 110 is made to slip and the output of the engine 101 is largely distributed to the work equipment 5. During the clutch operation with the left brake, the clutch pressure command value produced by the left brake and the command value found from the table T1 are compared with each other, and the lower command value is provided.

FIG. 11 shows the table T2 that is used for controlling the angle of the swash plate of the loader pump 120. A boom lever operation amount (%) is plotted against the abscissa in FIG. 11, and a target flow rate (%) is plotted against the ordinate in FIG. 11. The boom lever operation amount is an operation amount in the case of raising the boom 51. The target flow rate is represented by a ratio to the maximum flow rate. The settings are such that as the boom lever operation amount increases, a flow rate required for the loader pump 120 also increases.

Figure 12:
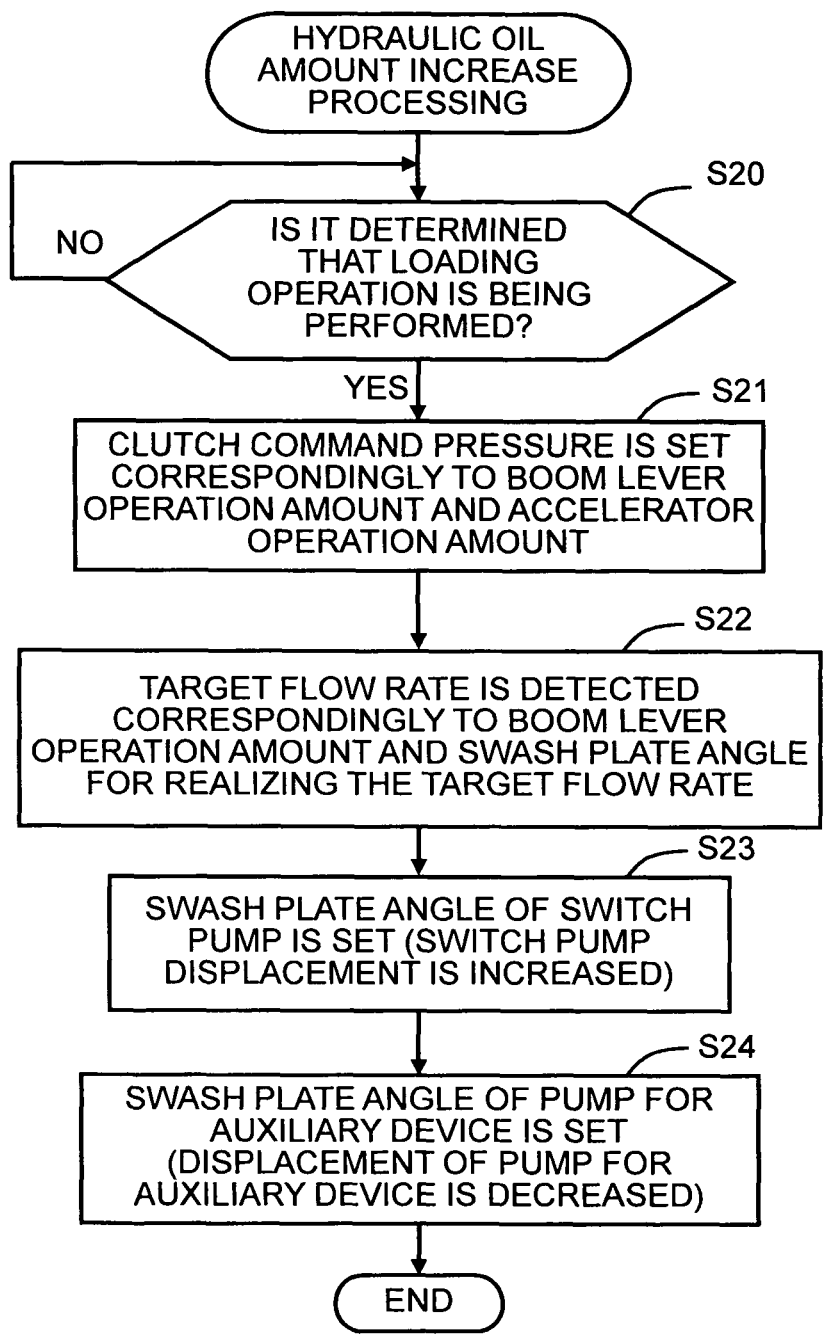
FIG. 12 is a flowchart of the processing conducted to increase the amount of hydraulic oil supplied to the work equipment.

FIG. 12 is a flowchart illustrating the processing conducted to increase the hydraulic oil amount. Where the loading operation detection unit 211 determines that a loading operation is being performed (S20: YES), the fluid amount increase output control unit 212 executes a plurality of fluid amount increase processing operations described hereinbelow.

In the first fluid amount increase processing, the clutch pressure control unit 212B of the fluid amount increase output control unit 212 uses the table T1 shown in FIG. 10 and determines the clutch command pressure correspondingly to the accelerator pedal operation amount and boom lever operation amount (S21). The clutch command pressure determined herein is less than the present clutch pressure. The clutch pressure control unit 212B outputs a clutch pressure control signal designating the determined clutch command pressure to the clutch 110 (S21). By decreasing the clutch command pressure, the engine power distributed to the hydraulic device system is increased. As a result, it is possible to increase the amount of fluid supplied to the boom cylinder 128.

In the second fluid amount increase processing, the swash plate angle control unit 212A of the fluid amount increase output control unit 212 detects the target flow rate corresponding to the boom lever operation amount by using the table T2 shown in FIG. 11, sets the swash plate angle for realizing the detected target flow rate, and outputs a swash plate angle control signal to the loader pump 120 (S22). As a result, the amount of fluid supplied to the boom cylinder 128 can be increased.

In the third fluid amount increase processing, the swash plate angle control unit 212A sets the swash plate angle such that the discharge from the switch pump 121 increases and outputs a control signal to the switch pump 121 (S23). The swash plate angle control unit 212A can set the swash plate angle of the switch pump 121, for example, on the basis of the following computational formula: "(swash plate angle (%) of the switch pump 121)=(swash plate angle (%) determined by the load sensing valve 124)+(increment (%) corresponding to the boom lever operation amount)".

The swash plate angle determined by the load sensing valve as referred to herein is a swash plate angle corresponding by the flow rate determined to be necessary for the operation of the steering cylinder 130. The increment corresponding to the boom lever operation amount as referred to herein is a swash plate angle corresponding to the flow rate determined to be necessary to aid the loader pump 120. When the sum total of the right side of the aforementioned computational formula exceeds 100%, the swash late angle of the switch pump 121 is limited to 100%.

In the fourth fluid amount increase processing, the swash plate angle control unit 212A sets the swash plate angle of the pump 131 for an auxiliary implement and outputs a control signal to the pump 131 for an auxiliary implement such that the flow rate of the hydraulic oil discharged from the pump 131 for an auxiliary implement decreases (S24). Where the pump 131 for an auxiliary implement is connected to the output distributor 102 via a valve clutch, the swash plate angle control unit 212A can release the engagement of the pump clutch instead of controlling the swash plate angle. As a result, the output distributed to the pump 131 for an auxiliary implement is distributed to the loader pump 120.

By implementing the first to fourth fluid amount increase processing in the above-described manner it is possible to supply a larger amount of hydraulic oil to the boom cylinder 128 and increase the rise speed of the boom 51 in a loading operation.

In the present embodiment, cases are described in which the first to fourth fluid amount increase processing operations are executed, but the present invention is not limited to such cases. For example, the fluid amount increase output control unit 212 may be configured to executed only either of the first fluid amount increase processing (S21) and second fluid amount increase processing (S22). The controller 200 may execute the first, second, and third fluid amount increase processing (S21, S22, S23), may execute only the first and second fluid amount increase processing (S21, S22), or execute only the first and third fluid amount increase processing (S21, S23) or the second and third fluid amount increase processing (S22, S23).

According to the above-described second embodiment, the flow rate of hydraulic oil supplied to the boom cylinder 128 is increased in the loading operation. Therefore, it is possible to increase the rise speed of the boom 51, shorten the time required for the loading operation, and improve the working efficiency. Further, since the flow rate of hydraulic oil to the boom cylinder 128 is increased automatically when the loading operation is started, it is not necessary for the operator to conduct extra operations, e.g. operate the brake pedal or the like, and the operability during loading operation is increased.

Further, in the second embodiment where it is detected that the loading operation is being performed, the first to fourth fluid amount increase processing operations (S21 to S24) are executed. Therefore, a large amount of the hydraulic oil can be supplied to the boom cylinder 128 and the boom 51 can be rapidly raised.

Embodiment 3

A variation example of the processing of detecting the loading operation, namely, a variation example of the loading operation detection unit 211, will be explained below. The third to tenth embodiments correspond to variation examples of the first and second embodiments.

Figure 13:
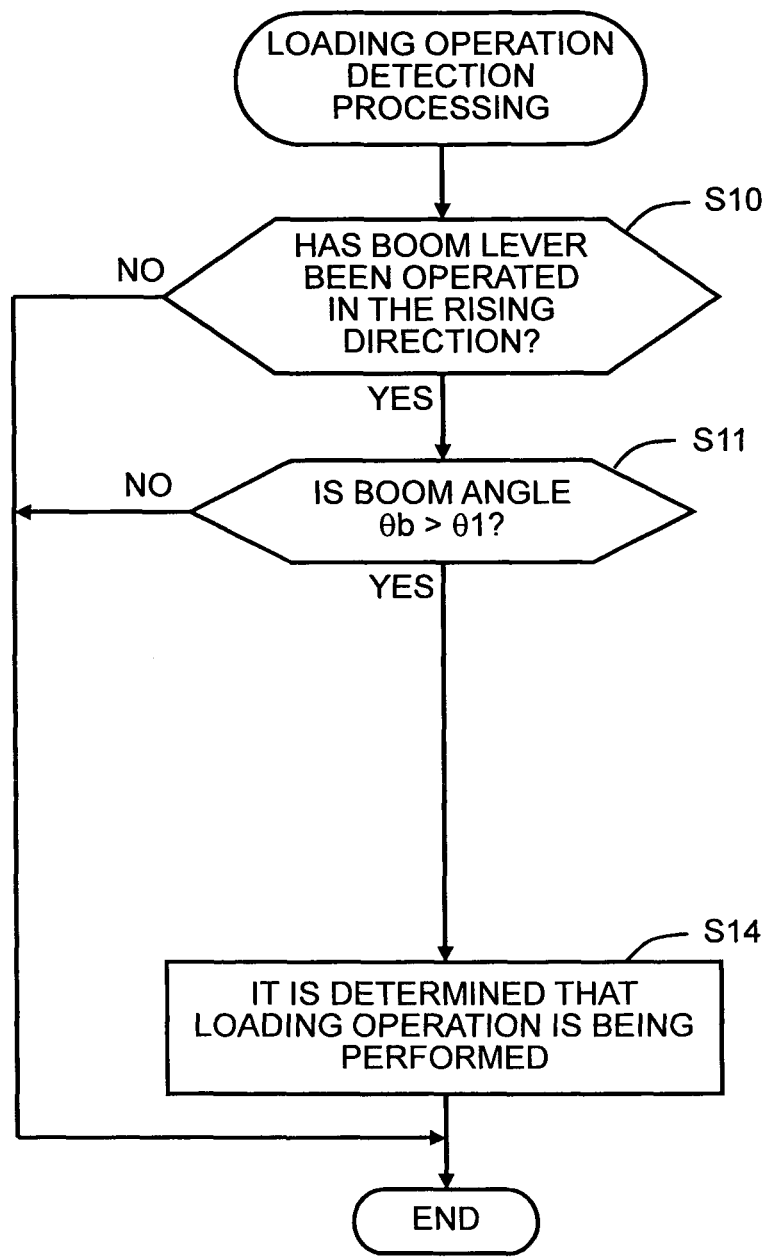
FIG. 13 is a flowchart of the loading operation processing according to the third embodiment of the present invention.

As shown in FIG. 13, in the third embodiment the loading operation detection unit 211 detects whether the boom lever 126 has been operated in the direction of rising (S10) and also determines whether the boom angle θb is greater than the predetermined value θ1 (S11). When both conditions are fulfilled, it is determined that the loading operation is being performed (S14).

In the present embodiment of such a configuration, the effect similar to that of the first and second embodiments is demonstrated. In the present embodiment the processing of detecting the loading operation is simplified with respect to that of the first and second embodiment. Therefore, the control program can be simplified with respect to that of the first and second embodiments.

Embodiment 4

Figure 14:
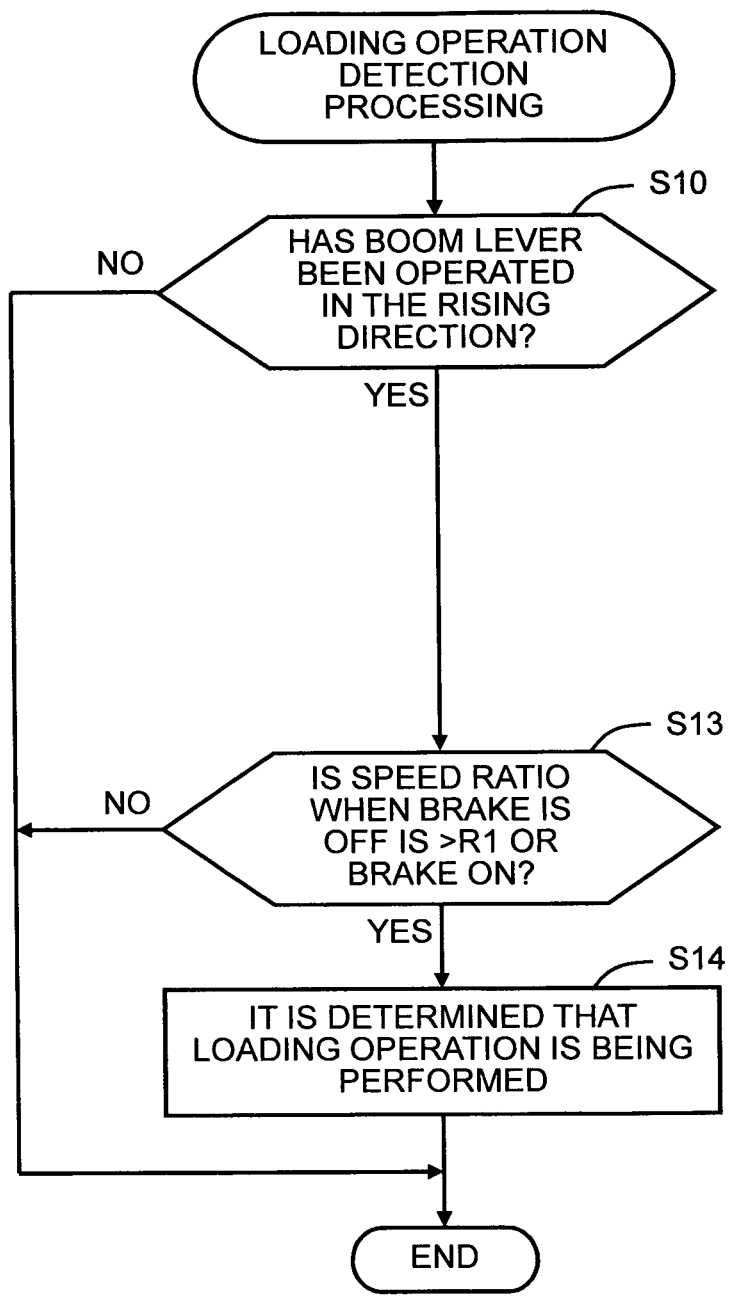
FIG. 14 is a flowchart of the loading operation processing according to the fourth embodiment of the present invention.

As shown in FIG. 14, in the fourth embodiment, the loading operation detection unit 211 determines the first condition (S10) and fourth condition (S13) described in the first embodiment and determines that the loading operation is being performed when both conditions are fulfilled (S14). In the embodiment of such a configuration, the effect similar to that of the third embodiment is demonstrated.

Embodiment 5

Figure 15:
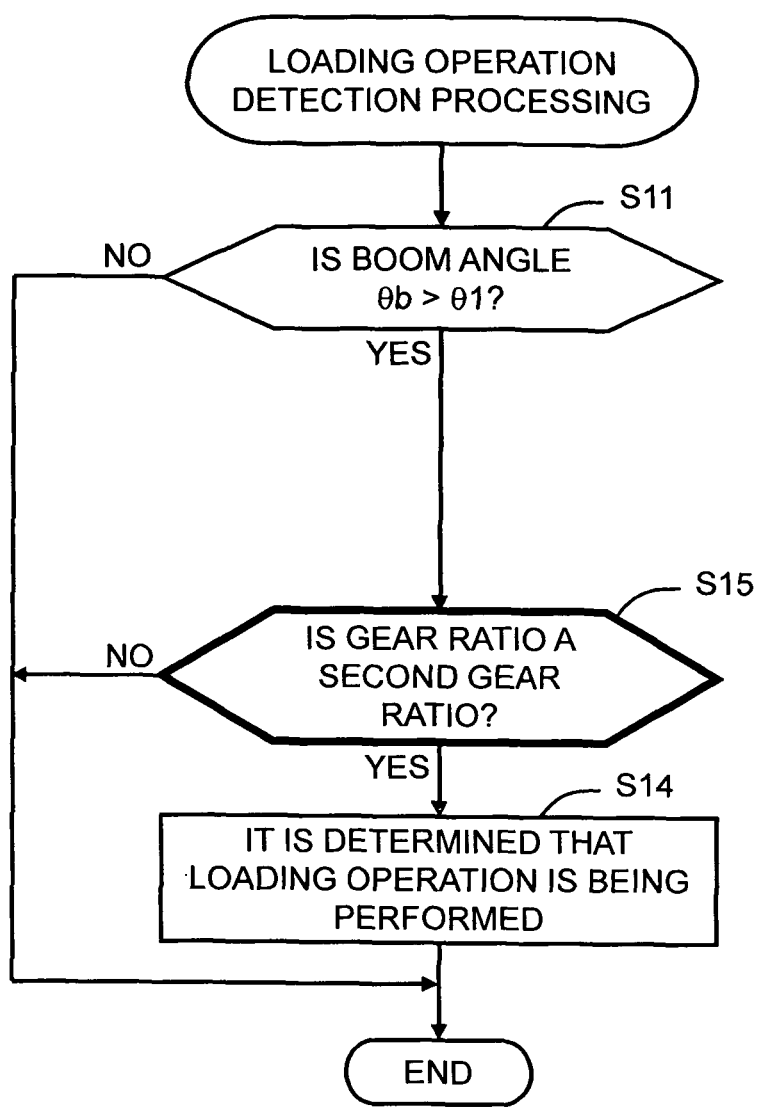
FIG. 15 is a flowchart of the loading operation processing according to the fifth embodiment of the present invention.

As shown in FIG. 15, in the fifth embodiment, the loading operation detection unit 211 determines whether the boom angle θb is greater than the predetermined value θ1 (S11) and also determines whether the second forward gear ratio has been set (S15). When both conditions are fulfilled, it is determined that the loading operation is being performed (S14). During the loading operation, since the working vehicle approaches the dump truck 10 in a state in which the load is accommodated in the bucket 52, the transmission 112 is often set to the second forward gear ratio.

However, the present invention is not limited to the second forward gear ratio. Thus, in S15, it is determined whether the gear ratio is a predetermined gear ratio that has been set in advance. In the present embodiment, a second gear ratio is taken as an example of the predetermined gear ratio. In the embodiment of such a configuration, the effect similar to that of the third embodiment is also demonstrated.

Embodiment 6

Figure 16:
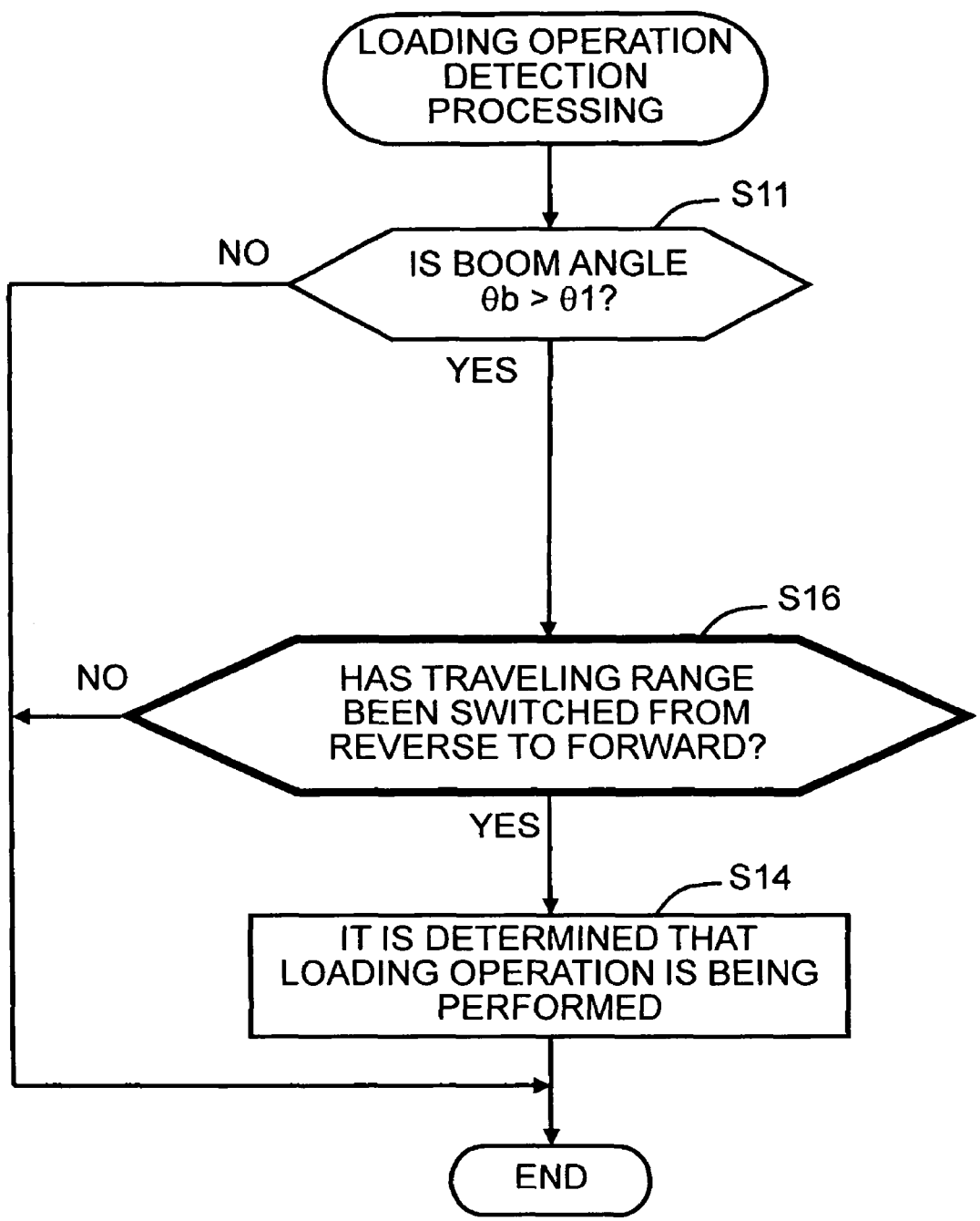
FIG. 16 is a flowchart of the loading operation processing according to the sixth embodiment of the present invention.

As shown in FIG. 16, in the sixth embodiment, the loading operation detection unit 211 determines whether the boom angle θb is greater than the predetermined value θ1 (S11) and also determines whether the traveling range has been switched from reverse to forward (S16). When both conditions are fulfilled, it is determined that the loading operation is being performed (S14).

As shown in FIG. 6, when a transition is made from the operation step P2 to the operation step P3, the traveling range is switched from reverse to forward. Therefore, this change in the traveling range can be used as information for detecting the start of loading operation. In the embodiment of such a configuration, the effect similar to that of the third embodiment is also demonstrated.

Embodiment 7

Figure 17:
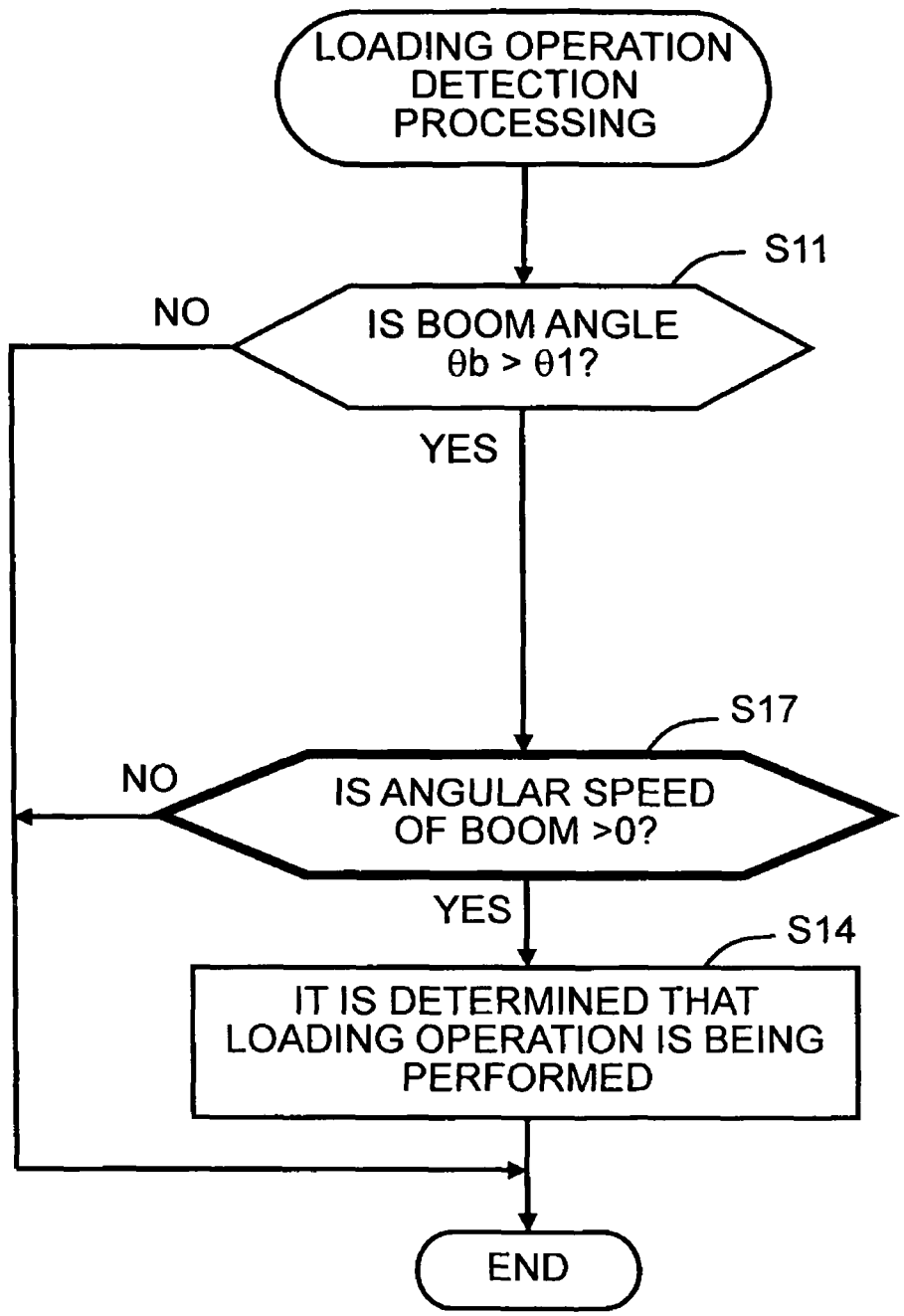
FIG. 17 is a flowchart of the loading operation processing according to the seventh embodiment of the present invention.

As shown in FIG. 17, in the seventh embodiment, the loading operation detection unit 211 determines whether the boom angle θb is greater than the predetermined value θ1 (S11) and also determines whether the angular speed of the boom 51 is greater than zero (S17). When both conditions are fulfilled, it is determined that the loading operation is being performed (S14).

During the loading operation, the boom 51 is lifted, while the working vehicle travels towards the dump truck 10. The cylinder rod of the boom cylinder 128 is extended thereby rotating the boom 51 upward. The boom cylinder 128 rotates clockwise about the rotation fulcrum at the proximal end side thereof correspondingly to the extension of the cylinder rod of the boom cylinder 128. Therefore, where the boom 51 is lifted can be determined by finding the angular speed of the boom 51 on the basis of the detection signal from the boom angle sensor 143.

In the embodiment of such a configuration, the effect similar to that of the third embodiment is also demonstrated. Further, the angular speed of the boom 51 can be also detected as an angular speed of the boom cylinder 128. Further, a configuration may be also used in which whether the extension speed of the cylinder rod of the boom cylinder 128 is equal to or greater than zero is determined instead of determining the angular speed. The extension speed of the cylinder rod may be calculated from the angular speed of the boom cylinder 128, and the extension speed of the cylinder rod may be calculated by using a linear sensor that directly detects the displacement of the cylinder rod.

Embodiment 8

Figure 18:
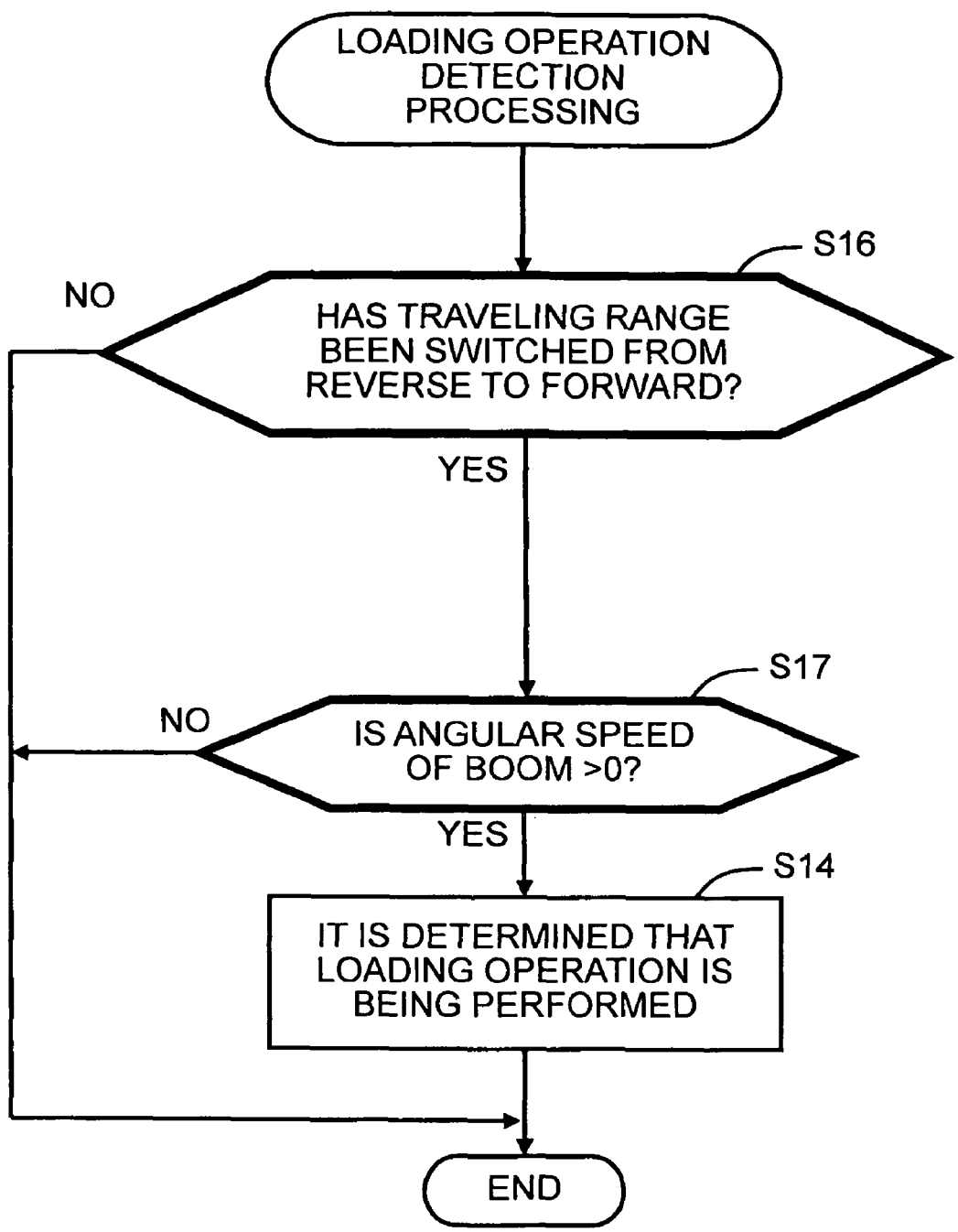
FIG. 18 is a flowchart of the loading operation processing according to the eighth embodiment of the present invention.

As shown in FIG. 18, in the eighth embodiment, the loading operation detection unit 211 determines whether the traveling range has been switched from reverse to forward (S16) and also determines whether the angular speed of the boom 51 is equal to or greater than zero (S17). When both conditions are fulfilled, it is determined that the loading operation is being performed (S14). In the present embodiment of such a configuration, the effect similar to that of the third embodiment is demonstrated Embodiment 9

Figure 19:
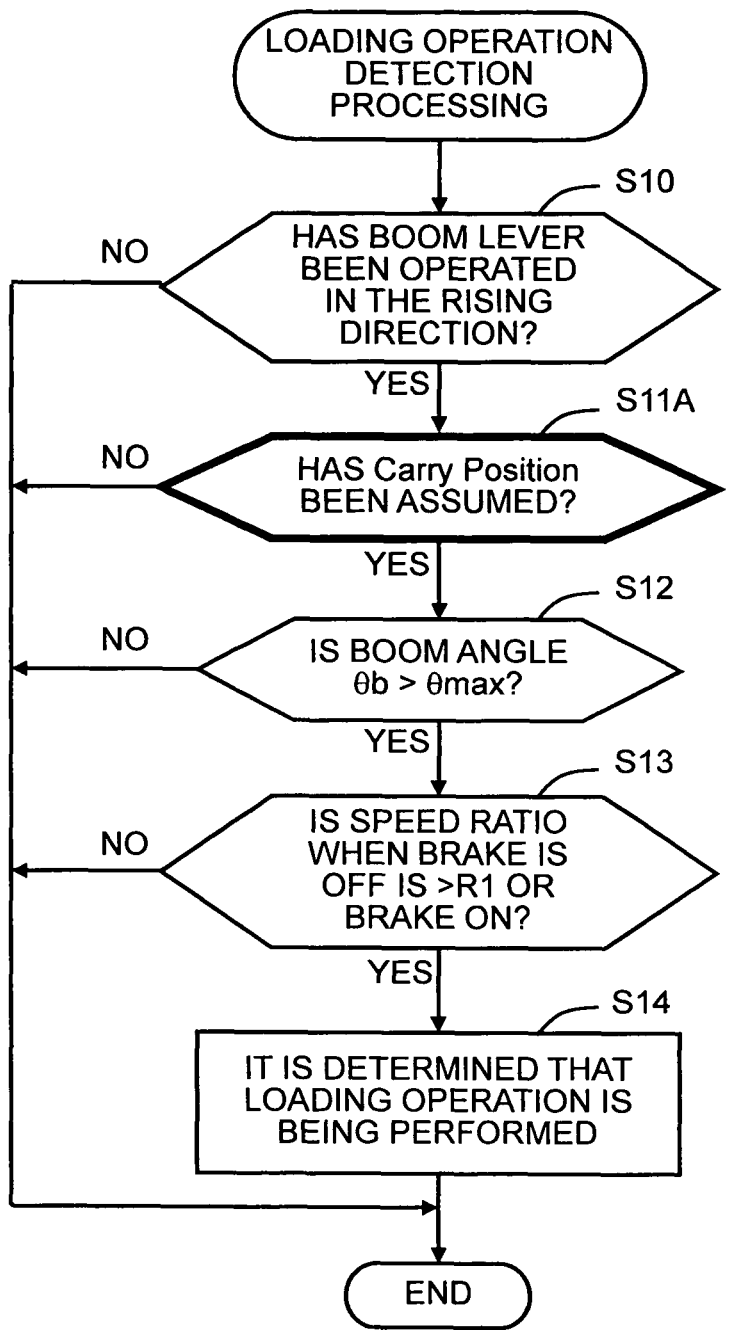
FIG. 19 is a flowchart of the loading operation processing according to the ninth embodiment of the present invention.

As shown in FIG. 19, in the ninth embodiment, the loading operation detection unit 211 determines whether the boom angle θb is in a "Carry Position" (S11A), instead of S11 in FIG. 8. The "Carry Position" is defined by the SAE standard and ISO standard. Therefore, S11A may be called a step of "determining whether the "Carry Position" stipulated by the SAE or ISO standard is assumed". In the embodiment of such a configuration, the effect similar to that of the third embodiment is also demonstrated.

Embodiment 10

Figure 20:
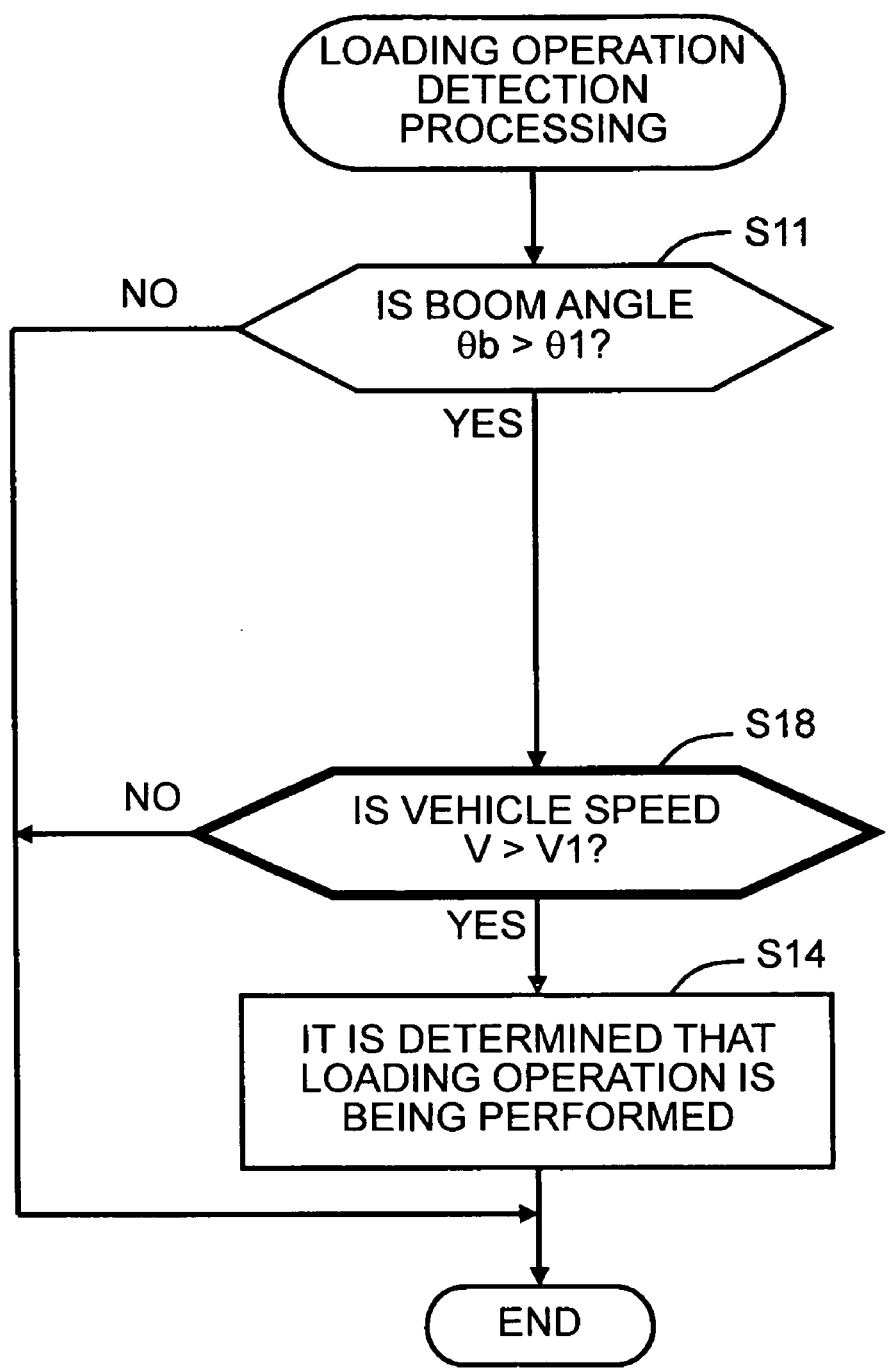
FIG. 20 is a flowchart of the loading operation processing according to the tenth embodiment of the present invention.

As shown in FIG. 20, in the tenth embodiment, the loading operation detection unit 211 determines whether the vehicle speed V has exceeded a predetermined speed V1 that has been set in advance (S18) instead of S15 in FIG. 15. When the boom angle θb exceeds θ1 (S11: YES) and the vehicle speed V exceeds V1, it can be determined that the loading operation is being performed.

Several embodiments of the present invention are described above. However, these embodiment merely serve to illustrate the present invention, and the scope of the invention is not limited to these embodiments. The present invention can be implemented in variety of other modes, without departing from the essence thereof.

For example, in the embodiments, the following types of information are listed as information for determining that the loading operation is being performed: whether the boom lever has been operated in the direction of rising, whether the boom angle is equal to or greater than a predetermined value, whether the boom angle is in a "Carry Position", whether the boom angle is less than an upper limit angle, whether the speed ratio when the brake is off is equal to or greater than a predetermined value, whether a predetermined gear ratio has been selected, whether the traveling range has been switched from reverse to forward, and whether the angular speed of the boom (angular speed of the boom cylinder) is equal to or greater than a predetermined value. Further, in the embodiments, a plurality of examples are explained in which the above-listed types of information (parameters) are advantageously combined, but the present invention is not limited to the combinations represented as embodiments and other combinations are also included in the scope of the present invention.

Further, for example, two or more embodiments from among the above-described embodiments may be combined together.

The invention claimed is:
1. A working vehicle comprising:
an engine;
a work equipment;
a traveling system;
a hydraulic device system provided with a cylinder that actuates the work equipment;
a distributor that distributes an output from the engine to the traveling system and the hydraulic device system;
a loading operation detection unit that detects whether a loading operation using the work equipment is being performed;
a clutch contained in the traveling system and connected to the distributor;

a maximum output characteristic control unit that, when it is detected that the loading operation is being performed, selects a second engine maximum output characteristic from among the second maximum output characteristic and a first engine maximum output characteristic in which a maximum output torque in a predetermined engine revolution speed range is lower than that in the second engine maximum output characteristic; and a hydraulic oil amount control unit that decreases a clutch pressure of the clutch when it is detected that the loading operation is being performed.

2. The working vehicle according to claim 1, wherein the hydraulic oil amount control unit performs the following operation (A) and/or (B) in addition to decreasing the clutch pressure of the clutch when it is detected that the loading operation is being performed:

(A) increasing a flow rate of hydraulic oil supplied from a first pump from among one or more pumps including the first pump for supplying hydraulic oil to the cylinder; and (B) supplying the hydraulic oil to the cylinder also from a second pump included in the one or more pumps, in addition to the hydraulic oil supplied from the first pump.

3. The working vehicle according to claim 1, wherein the loading operation detection unit determines that the loading operation is being performed when a boom lever is operated to raise the boom and an angle of the boom is equal to or greater than a predetermined angle.

4. The working vehicle according to claim 1, wherein there are at least two groups of conditions from among first to third groups of conditions, and each group of conditions includes at least one condition for determining that the loading operation is being performed, the first group of conditions is a group of conditions relating to expression of operator's will, the second group of conditions is a group of conditions relating to a position of the work equipment, the third group of conditions is a group of conditions relating to a state of the traveling system, and the loading operation detection unit detects that the loading operation is being performed when each of the conditions selected one by one from at least two groups of conditions from among the first to third groups of conditions is satisfied.

5. The working vehicle according to claim 4, wherein the work equipment is a boom provided rotatably at one side of a vehicle body, the cylinder is a boom cylinder for rotating the boom, and the first group of conditions includes at least one of the following conditions (a) and (b):

(a) a boom lever is operated to raise the boom; and
(b) an extension speed of the boom cylinder takes a positive value.

6. The working vehicle according to claim 4, wherein the work equipment is a boom provided rotatably at one side of a vehicle body, and the second group of conditions includes at least one of the following conditions (c) and (d):

(c) an angle of the boom is equal to or greater than a predetermined angle; and
(d) an angle of the boom is less than a predetermined maximum angle.

7. The working vehicle according to claim 4, wherein the third group of conditions includes at least one of the following conditions (e) to (h):

(e) a ratio of an input revolution speed and an output revolution speed of the clutch when a brake is off is equal to or greater than a predetermined value, or the brake is on;
(f) a gear ratio set to the transmission is a predetermined gear ratio;
(g) a traveling range set to the transmission has been switched from reverse to forward; and
(h) a vehicle speed is equal to or higher than a predetermined speed.

8. The working vehicle according to claim 5, wherein the third group of conditions includes at least one of the following conditions (e) to (h):

(e) a ratio of an input revolution speed and an output revolution speed of the clutch when a brake is off is equal to or greater than a predetermined value, or the brake is on;
(f) a gear ratio set to the transmission is a predetermined gear ratio;
(g) a traveling range set to the transmission has been switched from reverse to forward; and
(h) a vehicle speed is equal to or higher than a predetermined speed.

9. The working vehicle according to claim 6, wherein the third group of conditions includes at least one of the following conditions (e) to (h):

(e) a ratio of an input revolution speed and an output revolution speed of the clutch when a brake is off is equal to or greater than a predetermined value, or the brake is on;
(f) a gear ratio set to the transmission is a predetermined gear ratio;
(g) a traveling range set to the transmission has been switched from reverse to forward; and
(h) a vehicle speed is equal to or higher than a predetermined speed.

10. The working vehicle according to claim 2, wherein the loading operation detection unit determines that the loading operation is being performed when a boom lever is operated to raise the boom and an angle of the boom is equal to or greater than a predetermined angle.

11. The working vehicle according to claim 2, wherein there are at least two groups of conditions among first to third groups of conditions, and each group of conditions includes at least one condition for determining that the loading operation is being performed, the first group of conditions is a group of conditions relating to expression of operator's will, the second group of conditions is a group of conditions relating to a position of the work equipment, the third group of conditions is a group of conditions relating to a state of the traveling system, and the loading operation detection unit detects that the loading operation is being performed when each of the conditions selected one by one from at least two groups of condition from among the first to third groups of conditions is satisfied.

12. The working vehicle according to claim 3, wherein there are at least two groups of conditions among first to third groups of conditions, and each group of conditions includes at least one condition for determining that the loading operation is being performed, the first group of conditions is a group of conditions relating to expression of operator's will, the second group of conditions is a group of conditions relating to a position of the work equipment, the third group of conditions is a group of conditions relating to a state of the traveling system, and the loading operation detection unit detects that the loading operation is being performed when each of the conditions selected one by one from at least two groups of condition from among the first to third groups of conditions is satisfied.

13. The working vehicle according to claim 5, wherein
the work equipment is a boom provided rotatably at one side of a vehicle body, and
the second group of conditions includes at least one of the following conditions (c) and (d):
  (c) an angle of the boom is equal to or greater than a predetermined angle; and
  (d) an angle of the boom is less than a predetermined maximum angle.

14. A control device for a working vehicle including an engine, a work equipment, and a traveling system having a clutch, the control device comprising:
  a loading operation detection unit that detects whether a loading operation using the work equipment is being performed;
  a maximum output characteristic control unit that, when it is detected that the loading operation is being performed, selects a second engine maximum output characteristic from among the second maximum output characteristic and a first engine maximum output characteristic in which a maximum output torque in a predetermined engine revolution speed range is lower than that in the second engine maximum output characteristic; and
  a hydraulic oil amount control unit that decreases a clutch pressure of the clutch when it is detected that the loading operation is being performed.

15. A control method for a working vehicle including an engine, a work equipment, and a traveling system having a clutch, the control method comprising:
  a step of detecting whether a loading operation using the work equipment is being performed;
  a step of selecting, when it is detected that the loading operation is being performed, a second engine maximum output characteristic from among the second maximum output characteristic and a first engine maximum output characteristic in which a maximum output torque in a predetermined engine revolution speed range is lower than that in the second engine maximum output characteristic; and
  a step of decreasing a clutch pressure of the clutch when it is detected that the loading operation is being performed.

* * * * *